(12) United States Patent
Miyamoto

(10) Patent No.: US 10,824,407 B2
(45) Date of Patent: Nov. 3, 2020

(54) PROGRAM CONVERSION DEVICE, PROGRAM CONVERSION METHOD, AND NON-TRANSITORY RECORDING MEDIUM HAVING PROGRAM CONVERSION PROGRAM RECORDED THEREIN

(71) Applicant: NEC CORPORATION, Tokyo (JP)

(72) Inventor: Takamichi Miyamoto, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 310 days.

(21) Appl. No.: 16/067,911

(22) PCT Filed: Dec. 28, 2016

(86) PCT No.: PCT/JP2016/089022
§ 371 (c)(1),
(2) Date: Jul. 3, 2018

(87) PCT Pub. No.: WO2017/119378
PCT Pub. Date: Jul. 13, 2017

(65) Prior Publication Data
US 2020/0264855 A1  Aug. 20, 2020

(30) Foreign Application Priority Data
Jan. 4, 2016  (JP) ................................ 2016-000046

(51) Int. Cl.
*G06F 9/30* (2018.01)
*G06F 9/44* (2018.01)
(Continued)

(52) U.S. Cl.
CPC ............ *G06F 8/4434* (2013.01); *G06F 8/447* (2013.01); *G06F 8/441* (2013.01); *G06F 8/4441* (2013.01); *G06F 8/452* (2013.01)

(58) Field of Classification Search
CPC .... G06F 8/4434; G06F 8/44582; G06F 8/452; G06F 8/4441; G06F 8/447; G06F 8/441;
(Continued)

(56) References Cited

U.S. PATENT DOCUMENTS

2005/0170891 A1 * 8/2005 Shim ..................... A63F 13/12
463/42
2009/0012920 A1 * 1/2009 Kwok .................... G06N 3/004
706/12
(Continued)

FOREIGN PATENT DOCUMENTS

JP  58-149544 A  9/1983
JP  63-058574 A  3/1988
(Continued)

OTHER PUBLICATIONS

Jason Yu et al., Vector Processing as a Soft Processor Accelerator, Jun. 2009, [Retrieved on Jun. 9, 2020]. Retrieved from the internet: <URL: https://dl.acm.org/doi/pdf/10.1145/1534916.1534922> 34 pp. 1-34 (Year: 2009).*
(Continued)

*Primary Examiner* — Anibal Rivera
(74) *Attorney, Agent, or Firm* — Sughrue Mion, PLLC

(57) ABSTRACT

A program conversion device includes converting a program including second loop processing that repeats first processing and determination processing a plurality of times to a program including third loop processing and fourth loop processing; converting the converted program to a first-number-of-times repeating processing that includes second-number-of-times repeating processing of the first loop processing and the second-number-of-times repeating processing of the determination processing; converting the first processing and the determination processing to processing that accesses to memory areas that are different for fourth loop processing and that are continuous in a process-
(Continued)

ing order in the fourth loop processing; and exchanging a processing order of the fourth loop processing and the first loop processing, wherein the third loop processing is the-first-number-of-times repeating processing related to the second loop processing, and the fourth loop processing is the-second-number-of-times repeating processing related to the second loop processing in the third loop processing.

10 Claims, 22 Drawing Sheets

(51) Int. Cl.
*G06F 9/32* (2018.01)
*G06F 9/38* (2018.01)
*G06F 8/41* (2018.01)

(58) Field of Classification Search
CPC ............ G06F 15/7814; G06F 15/8084; G06F 9/3001; G06F 9/3013; G06F 9/30021; G06F 9/3838; G06F 9/3834
See application file for complete search history.

(56) References Cited

U.S. PATENT DOCUMENTS

| | | | | |
|---|---|---|---|---|
| 2010/0124983 A1* | 5/2010 | Gowin | .................... | G07F 17/32 463/25 |
| 2010/0151926 A1* | 6/2010 | Ruppert | .................. | G07F 17/32 463/1 |
| 2011/0302454 A1* | 12/2011 | Prophete | ............. | G06F 11/3688 714/38.1 |
| 2012/0110799 A1* | 5/2012 | Pellei | ...................... | A47F 7/143 24/570 |
| 2014/0213368 A1* | 7/2014 | Jacob | .................. | G07F 17/3241 463/42 |
| 2014/0359558 A1* | 12/2014 | Chamberlain | ............ | G06F 8/35 717/105 |
| 2015/0067819 A1* | 3/2015 | Shribman | ............... | H04L 67/06 726/12 |
| 2016/0179730 A1* | 6/2016 | Halleck | ............... | G06F 13/4027 710/105 |
| 2016/0180811 A1* | 6/2016 | Colenbrander | ........... | G06T 7/90 345/207 |
| 2016/0256784 A1* | 9/2016 | Schultz | ................. | A63F 13/355 |
| 2016/0332081 A1* | 11/2016 | Marr | ....................... | A63F 13/63 |
| 2018/0091392 A1* | 3/2018 | Richards | ............. | H04L 12/4633 |
| 2018/0091394 A1* | 3/2018 | Richards | ............. | H04L 41/0604 |
| 2018/0091401 A1* | 3/2018 | Richards | ............. | H04L 43/0817 |
| 2018/0091413 A1* | 3/2018 | Richards | ............. | H04L 12/4641 |
| 2018/0276111 A1* | 9/2018 | Datta | .................. | G06F 11/3696 |
| 2018/0349108 A1* | 12/2018 | Brebner | .................... | G06F 8/34 |
| 2019/0004793 A1* | 1/2019 | Brebner | .................... | G06F 8/41 |
| 2019/0134506 A1* | 5/2019 | Gupta | .................... | G16H 20/30 |
| 2019/0349449 A1* | 11/2019 | Shribman | ............. | H04L 63/029 |

FOREIGN PATENT DOCUMENTS

| | | |
|---|---|---|
| JP | 63-155264 A | 6/1988 |
| JP | 02-56065 A | 2/1990 |
| JP | 04-293150 A | 10/1992 |
| JP | 05-40780 A | 2/1993 |
| JP | 2003-256214 A | 9/2003 |

OTHER PUBLICATIONS

Matthew Naylor et al., Managing the FPGA Memory Wall: Custom Computing or Vector Processing?, IEEE 2013, [Retrieved on Jun. 9, 2020]. Retrieved from the internet: <URL: https://ieeexplore.ieee.org/stamp/stamp.jsp?tp=&arnumber=6645538> 6 pp. 1-6 (Year: 2013).*
Yoshiaki Takahashi, Hayai CPU no Shikumi Saishin Gijutsu Part 3 CPU o Ishiki Shita Programming, C Magazine, Nov. 1, 2005, pp. 38-39 vol. 17, No. 11, (whole No. 194).
International Search report of PCT/JP2016/089022 filed Mar. 21, 2017.
Decision to Grant a Patent dated Feb. 12, 2020 from the Japanese Patent Office in Application No. 2017-560367.

* cited by examiner

Fig.5

```
for (i1=0; i1<100; i1++){
  for (i2=0; i2<100; i2++){
    a1[i2]=a0[i2]*dx[i1];
    a2[i2]=a0[i2]*dy[i1];
  }
  for (i3=0; i3<20; i3++){
    v1+=a1[a3[i3]]-a2[a3[i3]];
  }
  if (v1>TH1) goto LABEL;
}
LABEL:
```

Fig.8

```
for (i1=0; i1<100; i1+=20){
  for (ii=0; ii<20; ii++){
    for (i2=0; i2<100; i2++){
      a1[i2]=a0[i2]*dx[i1+ii];
      a2[i2]=a0[i2]*dy[i1+ii];
    }
    for (i3=0; i3<20; i3++){
      v1+=a1[a3[i3]]-a2[a3[i3]];
    }
  }
  if (v1>TH1) goto LABEL;
}
LABEL:
```

Fig.10

```
for (i1=0; i1<100; i1+=20){
  for (ii=0; ii<20; ii++){
    for (i2=0; i2<100; i2++){
      a1[ii][i2]=a0[i2]*dx[i1+ii];
      a2[ii][i2]=a0[i2]*dy[i1+ii];
    }
  }
  for (ii=0; ii<20; ii++){
    for (i3=0; i3<20; i3++){
      v1[ii]+=a1[ii][a3[i3]]-a2[ii][a3[i3]];
    }
  }
  for (ii=0; ii<20; ii++){
    if (v1[ii]>TH1) goto LABEL;
  }
}
LABEL:
```

Fig.12

```
for (i1=0; i1<100; i1+=20){
  for (i2=0; i2<100; i2++){
    for (ii=0; ii<20; ii++){
      a1[i2][ii]=a0[i2]*dx[i1+ii];
      a2[i2][ii]=a0[i2]*dy[i1+ii];
    }
  }
  for (i3=0; i3<20; i3++){
    for (ii=0; ii<20; ii++){
      v1[ii]+=a1[a3[i3]][ii]-a2[a3[i3]][ii];
    }
  }
  for (ii=0; ii<20; ii++){
    if (v1[ii]>TH1) goto LABEL;
  }
}
LABEL:
```

Fig.14

| | ORDINARY VECTORIZATION-EFFICIENCY | IDEAL EXPECTED VECTORIZATION-EFFICIENCY | EVALUATION VALUE | SELECT OR NOT |
|---|---|---|---|---|
| FIRST INNER PROCESSING | 1.0 | 4.0 | 4.0 | SELECT |
| SECOND INNER PROCESSING | 1.0 | 4.0 | 4.0 | SELECT |
| THIRD INNER PROCESSING | 1.0 | 1.2 | 1.2 | NOT SELECT |
| FOURTH INNER PROCESSING | 1.0 | 1.0 | 1.0 | NOT SELECT |

```
#pragma hint averageiters=40
{
for (i1=0; i1<100; i1++){
  for (i2=0; i2<100; i2++){
    a1[i2]=a0[i2]*dx[i1];
    a2[i2]=a0[i2]*dy[i1];
  }
  for (i3=0; i3<20; i3++){
    v1+=a1[a3[i3]]-a2[a3[i3]];
  }
  if (v1>TH1) goto LABEL;
}
LABEL:
}
```

US 10,824,407 B2

PROGRAM CONVERSION DEVICE, PROGRAM CONVERSION METHOD, AND NON-TRANSITORY RECORDING MEDIUM HAVING PROGRAM CONVERSION PROGRAM RECORDED THEREIN

This application is a National Stage of International Application No. PCT/JP2016/089022 filed Dec. 28, 2016, claiming priority based on Japanese Patent Application JP 2016-000046 filed Jan. 4, 2016, the disclosure of which is incorporated herein in its entirety.

TECHNICAL FIELD

The present invention relates to a program conversion device and the like for converting a computer program being a conversion target in such a way as to improve execution efficiency, for example.

BACKGROUND ART

A vector processor quickly executes certain arithmetic processing by executing processing of applying the certain arithmetic processing to a plurality of numerical values all at once. Certain arithmetic processing appears in iteration processing such as loop processing in a computer program, for example. Hereinafter, a computer program is simply referred to as a "program".

However, an information processing device including a vector processor may not always execute an input program with high efficiency. A reason for this is that the input program is not converted to a program executable by a vector processor. For example, PTL 1 or PTL 2 discloses a compiler for converting an input program to an efficiently executable program in an information processing device including a vector processor.

The compiler disclosed in PTL 1 analyzes a reference relationship (dependency) of a variable and an array regarding individual loop processing in a source program. The compiler estimates a processing time (required time) when sequential scalar processing, sequential vector processing, parallel scalar processing, or parallel vector processing is executed regarding individual loop processing, and determines a combination of processing having a shortest processing time among estimated processing times. The compiler converts the source program to an object program in accordance with the determined combination.

The compiler disclosed in PTL 2 converts a source program including a plurality of multi-loops to an efficiently executable object program in a vector processor. The compiler selects an inner loop being an allocation destination to which an outer loop constituting the multi-loop is allocated. The compiler converts a dimension of an array referred to by a loop variable relating to one loop constituting the multi-loop to multiple dimensions, exchanges an inner loop and an allocated loop regarding a variable array of the multiple dimensions, and, thereby, converts the source program to an object program having high execution efficiency.

CITATION LIST

Patent Literature

PTL 1: Japanese Unexamined Patent Application Publication No. 1992(H04)-293150

PTL 2: Japanese Unexamined Patent Application Publication No. 2003-256214

SUMMARY OF INVENTION

Technical Problem

However, any of the compilers disclosed in PTL 1 or PTL 2 fails to convert a program to a highly efficiently executable object program, when the program refers to a memory area with a different variable from a loop variable. Hereinafter, the different variable will be referred to as a "reference variable". The loop variable is a memory area capable of storing a value depending on an iteration numbers in a loop. A reason for this is that these compilers convert a program to an object program including a vectorized loop processing that refers to a discontinuous memory area for a loop that refers to the discontinuous memory areas indicated by a value of the reference variable. This reason will be described in detail.

A vector processor reads data stored in a main memory (hereinafter, simply referred to as a "memory"), stores read data in a vector register in the vector processor, and executes arithmetic processing for data stored in the vector register. A vector register stores a plurality of pieces of data read from a memory, for example. A vector processor executes the arithmetic processing for data stored in a vector register all at once and achieves highly efficient processing for data stored in the memory.

However, the following two processing is essential for highly efficient execution with a vector processor when a memory area referred to by using a loop variable is discontinuous in a memory: specifically, processing of reading data stored in the memory area into a vector register, and processing of arranging an order of data in a vector register when storing the data in a memory area.

Consequently, an information processing device including a vector processor is unable to quickly execute loop processing, when a memory area to be referred to by using a loop variable is discontinuous in a memory.

An object program generated by the compiler described in PTL 1 or PTL 2 includes loop processing which refers to a discontinuous area in a memory. The loop processing refers to the discontinuous area by a reference variable. Therefore, an information processing device including a vector processor does not achieve quick execution of the loop processing. An example of processing that refers to a discontinuous area in a memory is a program having termination determination processing to be described later in "Description of Embodiments".

In view of the above, an object of the present invention is to provide a program conversion device and the like for converting even a program including a loop having termination determination processing to a quick program executable by an information processing device including a vector processor.

Advantageous Effects of Invention

Solution to Problem

As an aspect of the present invention, a program conversion device including:

program conversion means for converting a program including second loop processing that repeats first processing and determination processing a plurality of times to a program including third loop processing and fourth loop processing;

loop dividing means for converting the converted program to a first-number-of-times repeating processing that includes second-number-of-times repeating processing of the first loop processing and the second-number-of-times repeating processing of the determination processing;

variables reallocating means for converting the first processing and the determination processing to processing that accesses to memory areas that are different for fourth loop processing and that are continuous in a processing order in the fourth loop processing; and processing exchanging means for exchanging a processing order of the fourth loop processing and the first loop processing, wherein the first loop processing is executing first processing in order and accesses to a discontinuous area regarding to the order in the first processing, the determination processing is terminating the second loop processing based on whether or not a condition is satisfied, the third loop processing is the-first-number-of-times repeating processing related to the second loop processing, and the fourth loop processing is the-second-number-of-times repeating processing related to the second loop processing in the third loop processing.

In addition, as another aspect of the present invention, a program conversion method including:

converting a program including second loop processing that repeats first processing and determination processing a plurality of times to a program including third loop processing and fourth loop processing;

converting the converted program to a first-number-of-times repeating processing that includes second-number-of-times repeating processing of the first loop processing and the second-number-of-times repeating processing of the determination processing;

converting the first processing and the determination processing to processing that accesses to memory areas that are different for fourth loop processing and that are continuous in a processing order in the fourth loop processing; and exchanging a processing order of the fourth loop processing and the first loop processing, wherein the first loop processing is executing first processing in order and accesses to a discontinuous area regarding to the order in the first processing, the determination processing is terminating the second loop processing based on whether or not a condition is satisfied, the third loop processing is the-first-number-of-times repeating processing related to the second loop processing, and the fourth loop processing is the-second-number-of-times repeating processing related to the second loop processing in the third loop processing.

In addition, as another aspect of the present invention, a program conversion program including:

a program conversion function for converting a program including second loop processing that repeats first processing and determination processing a plurality of times to a program including third loop processing and fourth loop processing;

a loop dividing function for converting the converted program to a first-number-of-times repeating processing that includes second-number-of-times repeating processing of the first loop processing and the second-number-of-times repeating processing of the determination processing;

a variables reallocating function for converting the first processing and the determination processing to processing that accesses to memory areas that are different for fourth loop processing and that are continuous in a processing order in the fourth loop processing; and a processing exchanging function for exchanging a processing order of the fourth loop processing and the first loop processing, wherein the first loop processing is executing first processing in order and accesses to a discontinuous area regarding to the order in the first processing, the determination processing is terminating the second loop processing based on whether or not a condition is satisfied, the third loop processing is the-first-number-of-times repeating processing related to the second loop processing, and the fourth loop processing is the-second-number-of-times repeating processing related to the second loop processing in the third loop processing.

Furthermore, the object is also realized by a computer-readable recording medium that records the program.

Advantageous Effects of Invention

In a program conversion device and the like according to the present invention, it is possible to convert even a program including a loop having termination determination processing to a quick program executable by an information processing device including a vector processor.

BRIEF DESCRIPTION OF DRAWINGS

FIG. 5 is a diagram illustrating an example of a program to be input to the program conversion device.

FIG. 8 is a diagram illustrating an example of a program output as a result of conversion processing in Step S123.

FIG. 10 is a diagram illustrating an example of a program output as a result of conversion processing in Step S124.

FIG. 12 is a diagram illustrating an example of a program output as a result of conversion processing in Step S126.

FIG. 14 is a diagram conceptually illustrating an example of selection information.

DESCRIPTION OF EMBODIMENTS

Figure 23:
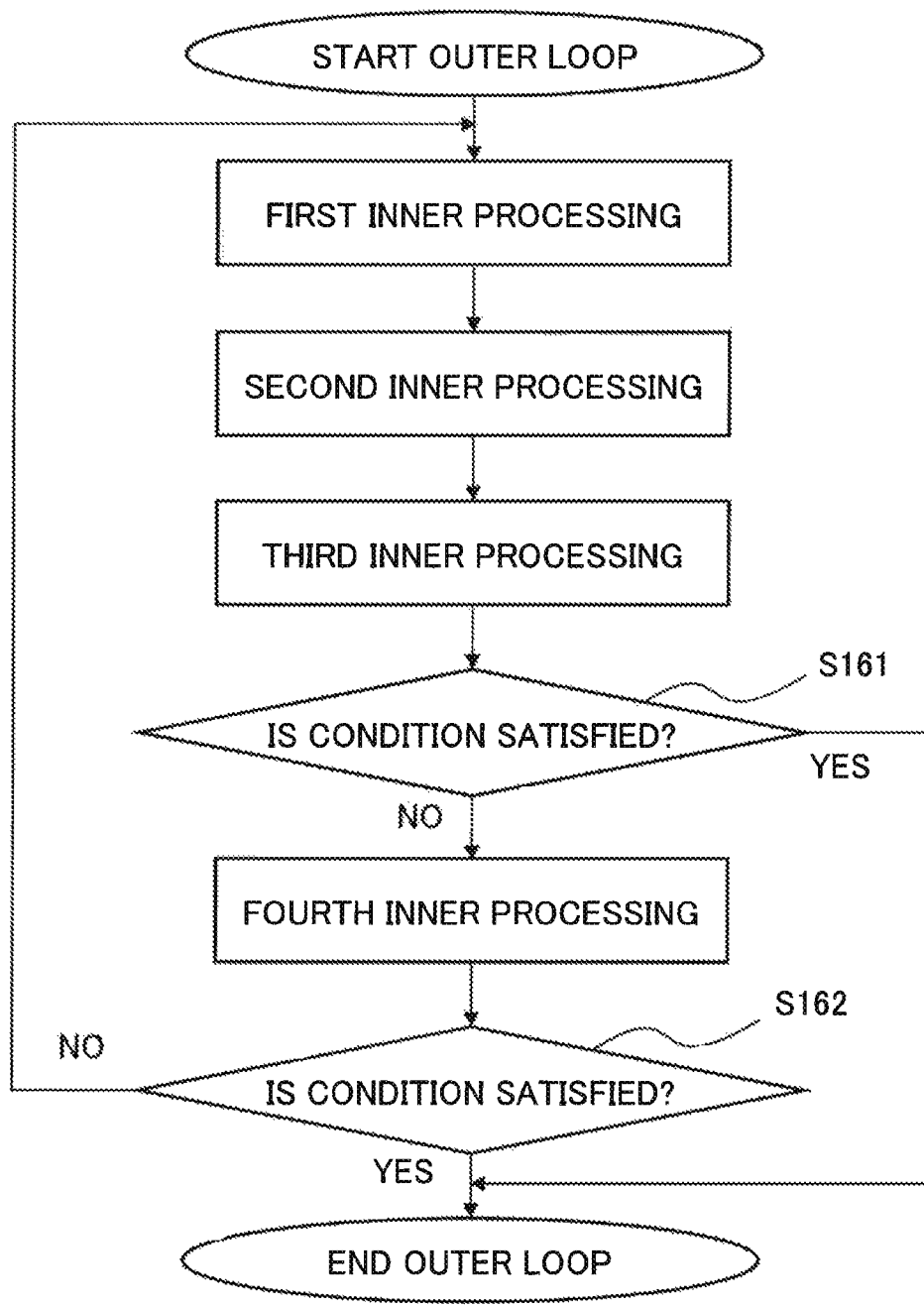
FIG. 23 is a diagram conceptually illustrating an example of a program including termination determination processing.

First of all, for easy understanding of the present invention, a loop including termination determination processing (processing of ending a loop) will be described in detail with reference to FIG. 23. FIG. 23 is a diagram conceptually illustrating an example of a program including termination determination processing.

A termination program includes, for example, first inner processing to fourth inner processing, and termination determination processing (Step S161 and Step S162). The termination program also includes iteration processing (for convenience of description, referred to as "outer loop processing") that repeats these processing a predetermined number of times.

First inner processing to fourth inner processing respectively indicate another iteration processing that repeats certain processing a predetermined number of times (for convenience of description, referred to as "inner loop processing"). First inner processing to fourth inner processing are constituted by an instruction sequence excluding a branch instruction (conditional determination instruction).

Termination determination processing indicates processing of terminating outer loop processing based on whether or not a certain determination condition is satisfied at a branch instruction. In other words, a termination program includes the outer loop processing including a plurality of inner loop processing and termination determination processing.

The number of inner processing in a termination program is not always four, and may be a plural number. Further, the number of termination determination processing in a termination program is not always two, and may be one or more. A termination program is not limited to the above-described examples.

High efficiency on an target information processing device including a vector processor can be achieved by converting loop processing in the program to an object program that the vector processor executes quickly (so-called vectorization). A quick program executable by a vector processor is, for example, a program that continuously accesses to a memory area regarding a loop variable capable of storing a value depending on iteration numbers of a loop. An information processing device including a vector processor is unable to quickly execute a program that discontinuously accesses to a memory area (so-called indirect reference, and the like) regarding a loop variable capable of storing a value depending on iteration numbers of a loop.

In respective example embodiments described in the following, for convenience of description, it is assumed that a variable indicates to one memory area in a memory. It is assumed that a value of a variable indicates data stored in the one memory area. For example, it is assumed that processing of "reading a value of a variable" indicates processing of "reading data stored in a memory area". Further, it is assumed that an array indicates a series of memory areas constituted by a plurality of variables. It is assumed that individual element of an array indicates respective variables in a plurality of variables.

For example, an array "a" includes N elements (variables) (where N is a natural number). In this case, it is assumed that a[i] (where "i" is a natural number that satisfies a condition: $1 \leq i \leq N$) indicates an i-th variable in the array a. It is assumed that an array a[M][N] (where M is a natural number) includes (M×N) elements. In this case, it is assumed that, in a memory, elements are stored in memory areas continuous in order of suffix in a second dimension (specifically, a dimension indicated by N), and further, it is assumed that the continuous memory areas are allocated in order of first dimension (specifically, a dimension indicated by M). Specifically, it is assumed that respective elements in the array a[M][N] are stored continuously in memory areas in order of a[1][1], a[1][2], . . . , a[1][N], a[2][1], a[2][2], . . . , a[2][N], . . . a[M][1], a[M][2], . . . , and a[M][N].

In the following description, for convenience of description, it is assumed that loop processing will be symbolized by an iteration instruction constituting the loop processing.

Next, example embodiments for implementing the present invention will be described in detail with reference to the drawings.

First Example Embodiment

Figure 1:
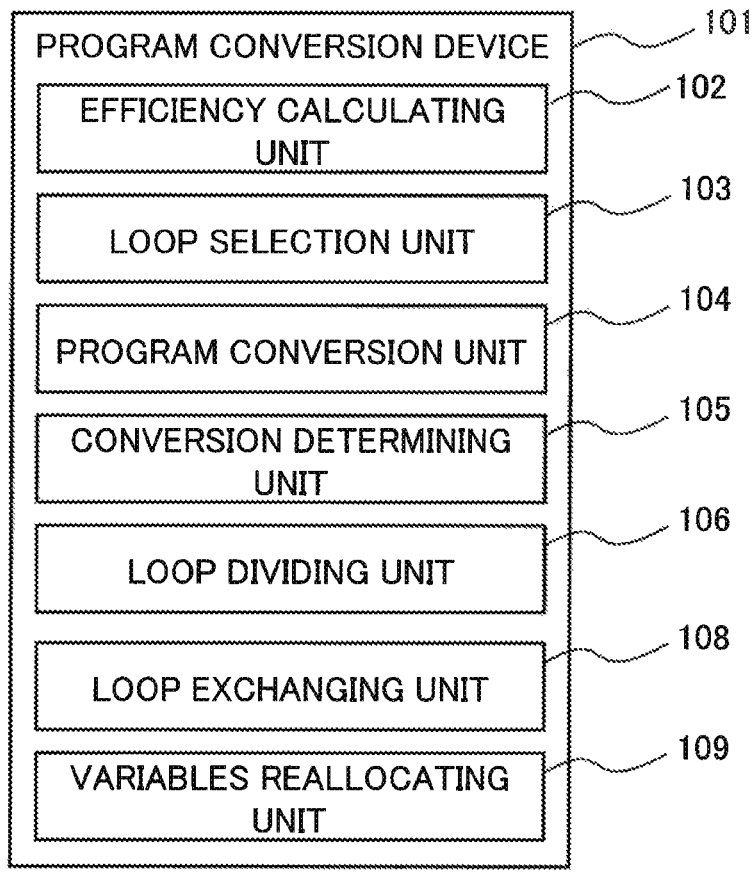
FIG. 1 is a block diagram illustrating a configuration of a program conversion device according to a first example embodiment of the present invention.

A configuration of a program conversion device 101 according to a first example embodiment of the present invention will be described in detail with reference to FIG. 1. FIG. 1 is a block diagram illustrating a configuration of the program conversion device 101 according to the first example embodiment of the present invention.

The program conversion device 101 according to the first example embodiment includes an efficiency calculating unit (efficiency calculator) 102, a loop selection unit (loop selector) 103, a program conversion unit (program converter) 104, a conversion determining unit (conversion determiner) 105, a loop dividing unit (loop divider) 106, a loop exchanging unit (loop exchanger) 108, and a variables reallocating unit (variables re-allocator) 109.

Figure 2:
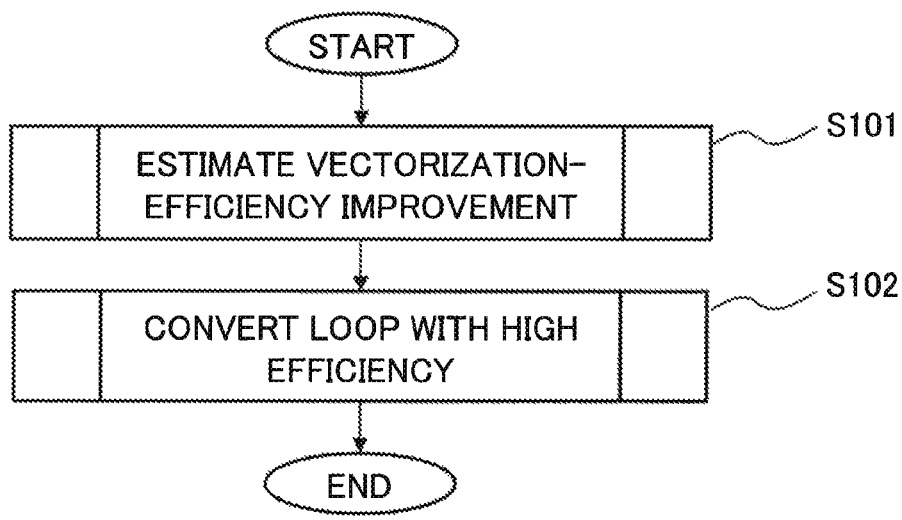
FIG. 2 is a flowchart illustrating an outline of a flow of processing in the program conversion device according to the first example embodiment.

An outline of a flow of processing in the program conversion device 101 according to the first example embodiment of the present invention will be described with reference to FIG. 2. FIG. 2 is a flowchart illustrating an outline of a flow of processing in the program conversion device 101 according to the first example embodiment.

The program conversion device 101 obtains a program (exemplified in FIG. 23) such as a termination program, and estimates efficiency improvement to be acquired by vectorization (Step S101). Then, the program conversion device 101 converts loop processing having estimated high efficiency improvement (Step S102). A detailed flow of processing in Step S101 will be described later with reference to FIG. 3. A detailed flow of processing in Step S102 will be described later with reference to FIG. 4.

Hereinafter, for convenience of description, a program will be described by using the C programming language being a program language. A program, however, may not be described by using the C programming language. Further, in the present example embodiment, detail of the C programming language is omitted.

Next, an example of a program to be input to the program conversion device 101 will be described. FIG. 5 is a diagram illustrating an example of a program to be input to the program conversion device 101.

In a program exemplified in FIG. 5, an instruction "for" indicates loop processing. For example, a program exemplified in FIG. 5 includes loop processing "for(i1=0;i1<100; i1++)", loop processing "for(i2=0;i2<100;i2++)", and loop processing "for(i3=0;i3<20;i3++)".

For convenience of description, in a program, loop processing at an outermost position is referred to as outer loop processing. Loop processing included in the outer loop processing is referred to as inner processing. In a program exemplified in FIG. 5, outer loop processing is loop processing "for(i1=0;i1<100;i1++)". In a program exemplified in FIG. 5, inner processing is loop processing "for(i2=0; i2<100;i2++)" and loop processing "for(i3=0;i3<20;i3++)".

Figure 6:
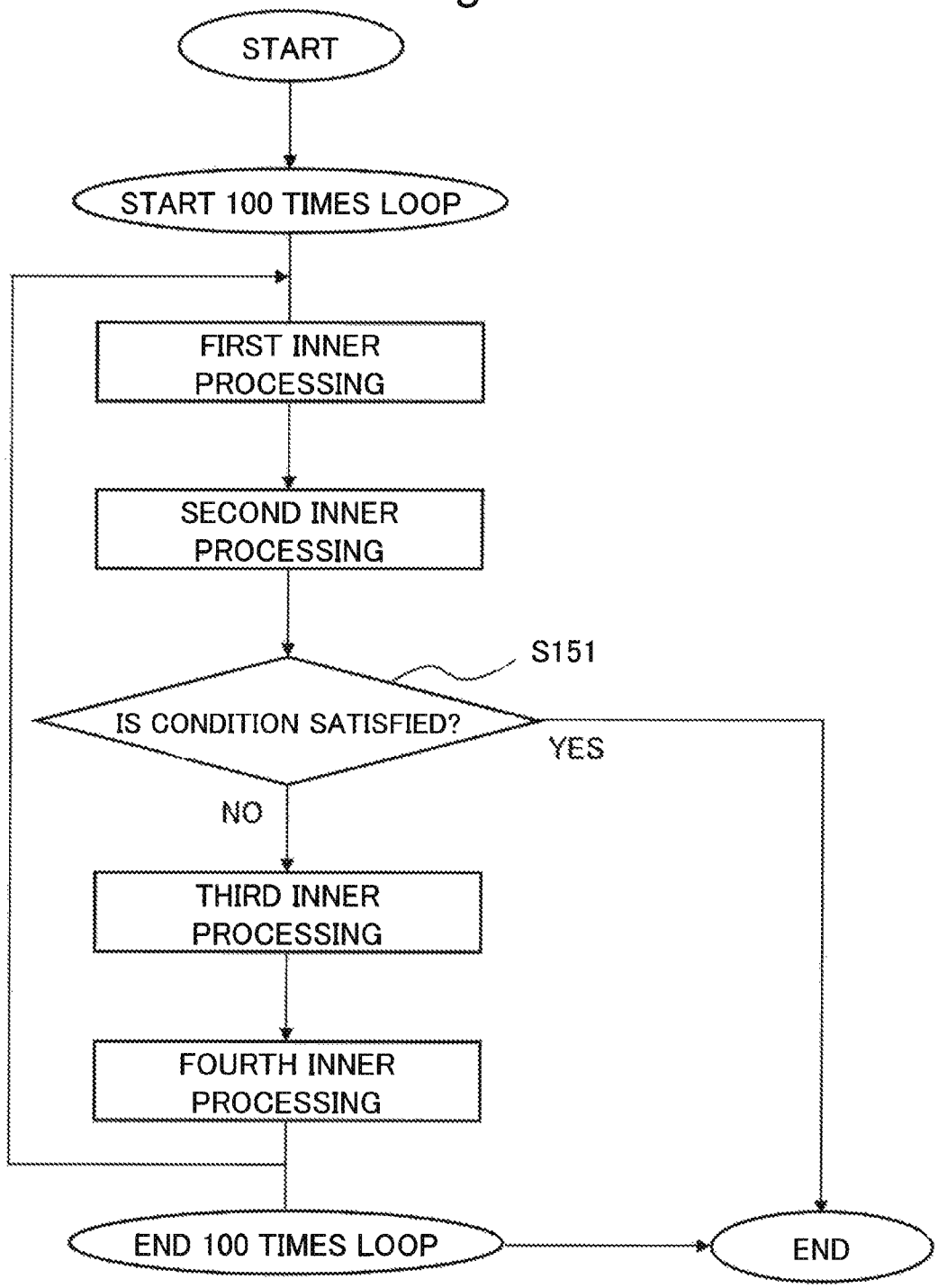
FIG. 6 is a flowchart illustrating a flow of processing in the program exemplified in FIG. 5.

Processing in a program exemplified in FIG. 5 will be described with reference to FIG. 6. FIG. 6 is a flowchart illustrating a flow of processing in a program exemplified in FIG. 5. Note that in a program exemplified in drawings such as FIG. 5, "*" indicates multiplication operator.

Referring to FIG. 6, processing defined by "start 100 times loop" and "end 100 times loop" indicates loop processing "for(i1=0;i1<100;i1++)" illustrated in FIG. 5. First inner processing indicates loop processing "for(i2=0; i2<100;i2++)" illustrated in FIG. 5. Second inner processing indicates loop processing "for(i3=0;i3<20;i3++)" illustrated in FIG. 5. Processing illustrated in Step S151 indicates determination processing "if (v1>TH1) goto_LABEL" illustrated in FIG. 5. In FIG. 6, third inner processing and fourth inner processing are illustrated. Alternatively a program illustrated in FIG. 6 may further include more processing. A program to be input to the program conversion device 101 is not limited to the examples illustrated in FIG. 5 and FIG. 6.

For convenience of description, it is assumed that information relating to a size of a vector register in a vector processor included in an information processing device (a length or a size, specifically, a vector processor length) is input to the program conversion device 101. Further, it is assumed that the system clock cycle required for processing respective instructions by an information processing device (or a vector processor) is input to the program conversion device 101.

Figure 3:
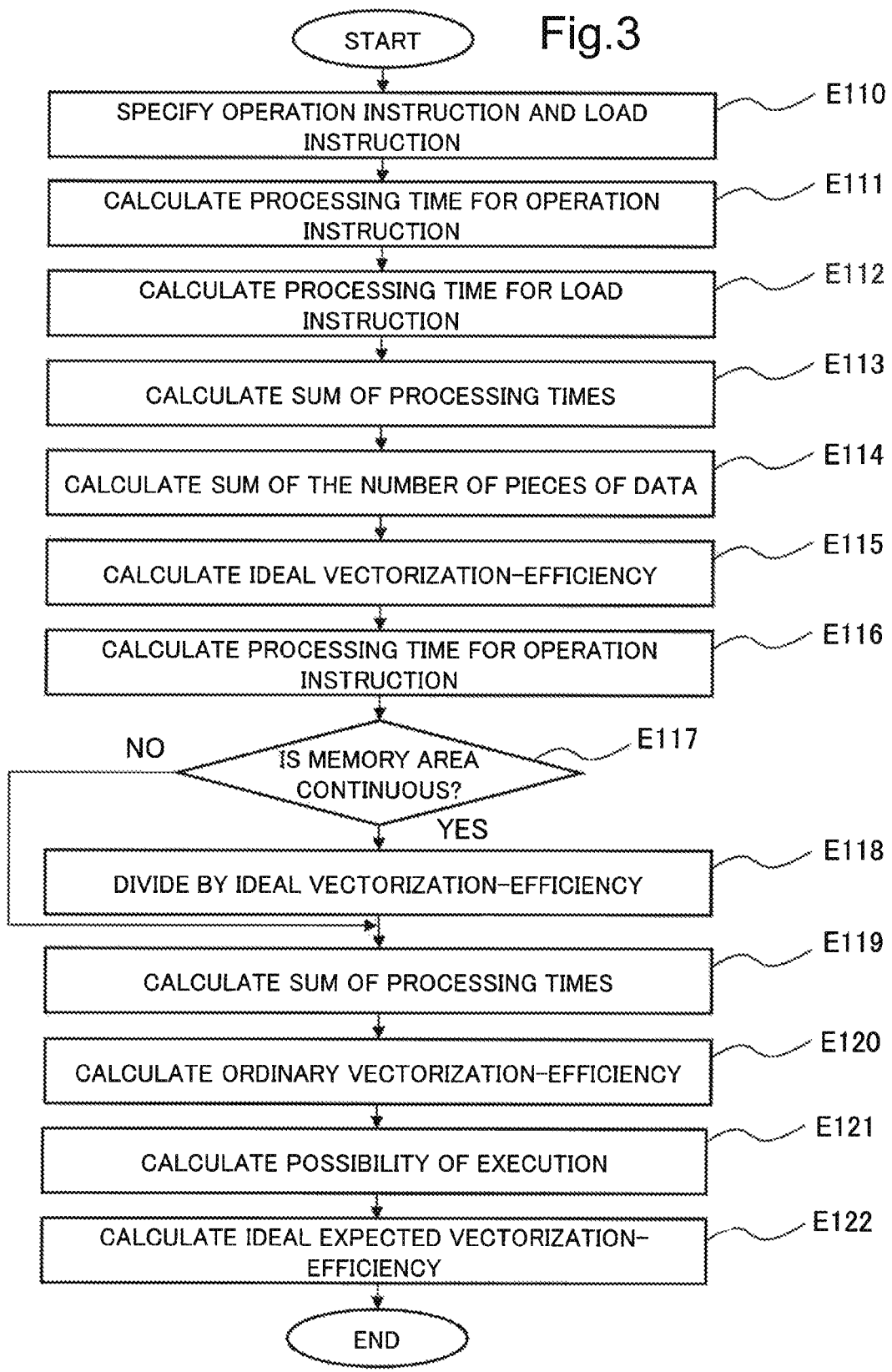
FIG. 3 is a flowchart illustrating a flow of processing in the program conversion device according to the first example embodiment.

Next, processing in the program conversion device 101 according to the first example embodiment of the present invention will be described in detail with reference to FIG. 3. FIG. 3 is a flowchart illustrating a flow of processing in the program conversion device 101 according to the first example embodiment.

The efficiency calculating unit 102 specifies an operation instruction constituting the inner processing and a load instruction constituting the inner processing for each inner processing in a termination program (Step E110). The efficiency calculating unit 102 calculates a processing time for the specified operation instruction, and a processing time for the specified load instruction (Step E111 and Step E112). The efficiency calculating unit 102 calculates a sum of the calculated processing time for the operation instruction (calculated in Step E111) and the calculated processing time for the load instruction (calculated in Step E112). The efficiency calculating unit 102, thereby, calculates a processing time (referred to as a "non-vectorized time") of a non-vectorized termination program (Step E113).

For example, a processing time of an operation instruction (or a load instruction) is calculated by multiplying system clock cycle required for the operation instruction (or the load instruction) by a time per system clock cycle. The system clock cycle for an operation instruction (or a load instruction) is defined depending on a chip-set in which the operation instruction is defined. The efficiency calculating unit 102 calculates the system clock cycle for each specified operation instruction (or for each specified load instruction), and calculates a processing time for the operation instruction (or the load instruction) by multiplying the calculated system clock cycle by a time per system clock cycle, for example.

Next, the efficiency calculating unit 102 calculates a sum of the number of pieces of data relating to a variable (or an array) to be accessed by a loop constituting respective inner processing (Step E114). In this case, the efficiency calculating unit 102 specifies all variables which may be indicated by a value of a loop variable, and calculates a sum of the number of pieces of data to be stored in the specified respective variables. The efficiency calculating unit 102 calculates an efficiency of ideal vectorization (hereinafter, referred to as an "ideal vectorization-efficiency") of the loop by dividing a calculated sum by the number of pieces of data storable in a vector register in a vector processor (specifically, a vector processor length) (Step E115).

Next, the efficiency calculating unit 102 divides a processing time for the operation instruction calculated in Step E111 by the ideal vectorization-efficiency calculated in Step E115 (Step E116). Specifically, in Step E116, the efficiency calculating unit 102 calculates a processing time of executing an object program including vectorized inner processing with a vector processor.

The efficiency calculating unit 102 determines whether or not a memory area to be accessed by the load instruction specified in Step E110 is continuously located in a memory in order of access (Step E117). When a memory area to be accessed is continuous in a memory (YES in Step E117), the efficiency calculating unit 102 divides a processing time for the load instruction calculated in Step E112 by the ideal vectorization-efficiency (Step E118). In Step E118, the efficiency calculating unit 102 calculates a processing time of executing the load instruction included in vectorized inner processing by a vector processor.

When a memory area to be accessed is not continuous in a memory (NO in Step E117), the efficiency calculating unit 102 outputs the processing time for the load instruction calculated in Step E112, as a processing time for executing an object program in which a load instruction in inner processing is vectorized. In this case, the efficiency calculating unit 102 calculates a processing time for a non-vectorized load instruction and, thereby, calculates a processing time for executing an object program by a vector processor. Specifically, by processing illustrated in Step E117 and Step E118, the efficiency calculating unit 102 calculates a processing time for executing a load instruction by an information processing device including a vector processor based on whether or not a memory area to be accessed is continuous (specifically, processing is quickly executed by a vector processor).

The efficiency calculating unit 102 calculates the sum of a time calculated in Step E116, and the time calculated in Step E112 or Step E118, and, thereby, calculates a processing time (hereinafter, referred to as a "vectorized time") of executing a vectorized object program for an input program by a vector processor (Step E119).

The efficiency calculating unit 102 calculates a vectorization-efficiency relating to inner processing by dividing the non-vectorized time calculated in Step E113 by the vectorized time calculated in Step E119 (Step E120). Specifically, a vectorization-efficiency indicates a ratio of a processing time for a program with a vector processor to a processing time for the program without a vector processor. The program is converted by a general compiler. Therefore, a processing time by a vector processor is shorter, as a value of a vectorization-efficiency is larger. Hereinafter, a vectorization-efficiency calculated in Step E120 is also referred to as an "ordinary vectorization-efficiency".

The efficiency calculating unit 102 calculates an ordinary vectorization-efficiency relating to respective inner processing by executing processing illustrated in Step E110 to Step E120 regarding respective inner processing in a program.

Figure 7:
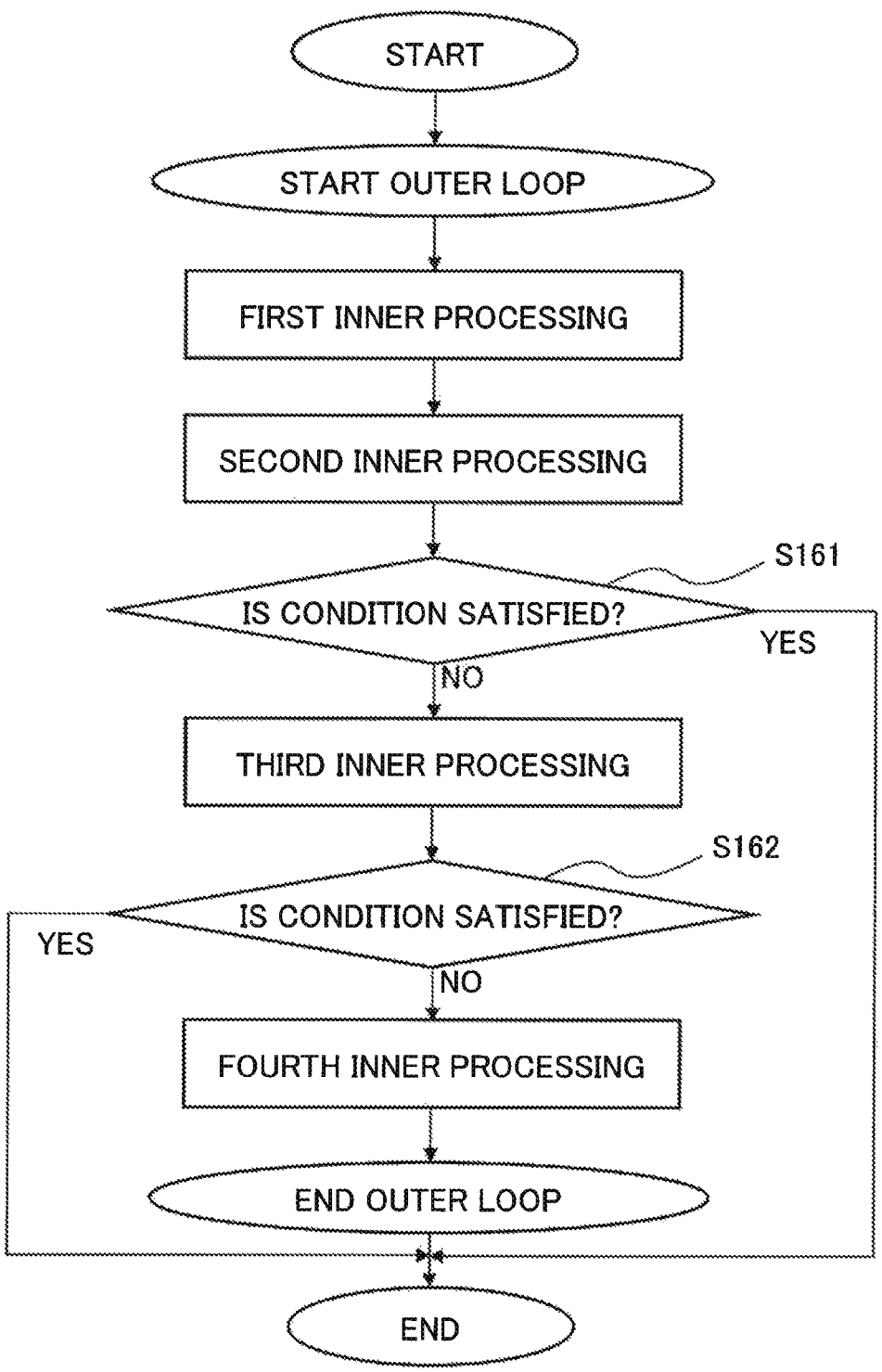
FIG. 7 is a flowchart illustrating a flow of processing in a termination program.

Herein, a termination program (exemplified in FIG. 7) referred to in description relating to Step E121 and Step E122 will be described. FIG. 7 is a flowchart illustrating a flow of processing in a termination program. A termination program exemplified in FIG. 7 includes outer loop processing, first to fourth inner processing included in the outer loop processing, and termination determination processing of determining whether or not processing in outer loop processing is ended (Step S161 and Step S162). When a determination condition illustrated in Step S161 is not satisfied (NO in Step S161), third inner processing and fourth inner processing are executed in the termination program. Further, when a determination condition illustrated in Step S162 is not satisfied (NO in Step S162), fourth inner processing is executed.

Next, processing (Step E121 and Step E122) to be executed by the program conversion device 101, when a termination program exemplified in FIG. 7 is input, will be described with reference to FIG. 3. The efficiency calculating unit 102 calculates a possibility that respective inner processing in a program are executed based on the number of times of determination processing via which the inner processing is executed, for example (Step E121). The efficiency calculating unit 102 calculates a possibility (degree) with which inner processing is executed by multiplying a predetermined value by the number of times of determination processing, for example.

For convenience of description, it is assumed that a predetermined value is 50%. The predetermined value may not be necessarily 50%, and may be a different value such as 25% or 75%, for example. A predetermined value is not limited to the above-described examples.

For example, in a case of a termination program exemplified in FIG. 7, first inner processing and second inner processing are executed without via termination determination processing (Step S161 and Step S162). Therefore, the number of times of determination processing via which first inner processing or second inner processing is executed is 0 time. In this case, the efficiency calculating unit 102 calculates that possibilities of execution of the first inner processing and possibilities of execution of the second inner processing are 100%.

In a case of a termination program exemplified in FIG. 7, third inner processing is executed when a determination condition illustrated in Step S161 is not satisfied, and is not executed when a determination condition illustrated in Step S161 is satisfied. Therefore, the number of times of termination determination processing via which third inner processing is executed is one time. In this case, the efficiency calculating unit 102 calculates that a possibility of execution of the third inner processing is 50% (=100%×50%) by multiplying 100% by a predetermined value, the number of times of termination determination processing (in this case, one time).

In a case of a termination program exemplified in FIG. 7, fourth inner processing is executed when a determination condition illustrated in Step S162 is not satisfied, and is not executed when a determination condition illustrated in Step S162 is satisfied. Therefore, the number of times of termination determination processing (Step S161 and Step S162) via which fourth inner processing is executed is two times. In this case, the efficiency calculating unit 102 calculates that a possibility of execution of the fourth inner processing is 25%(=100%×50%×50%) by multiplying 100% by a predetermined value the number of times of termination determination processing (in this case, two times).

After calculating the execution-possibility of inner processing in a termination program is executed, the efficiency calculating unit 102 calculates a value (hereinafter, referred to as an "ideal expected vectorization-efficiency) by multiplying the calculated possibility regarding inner processing by the ideal vectorization-efficiency calculated in Step E115 regarding the inner processing (Step E122).

Figure 4:
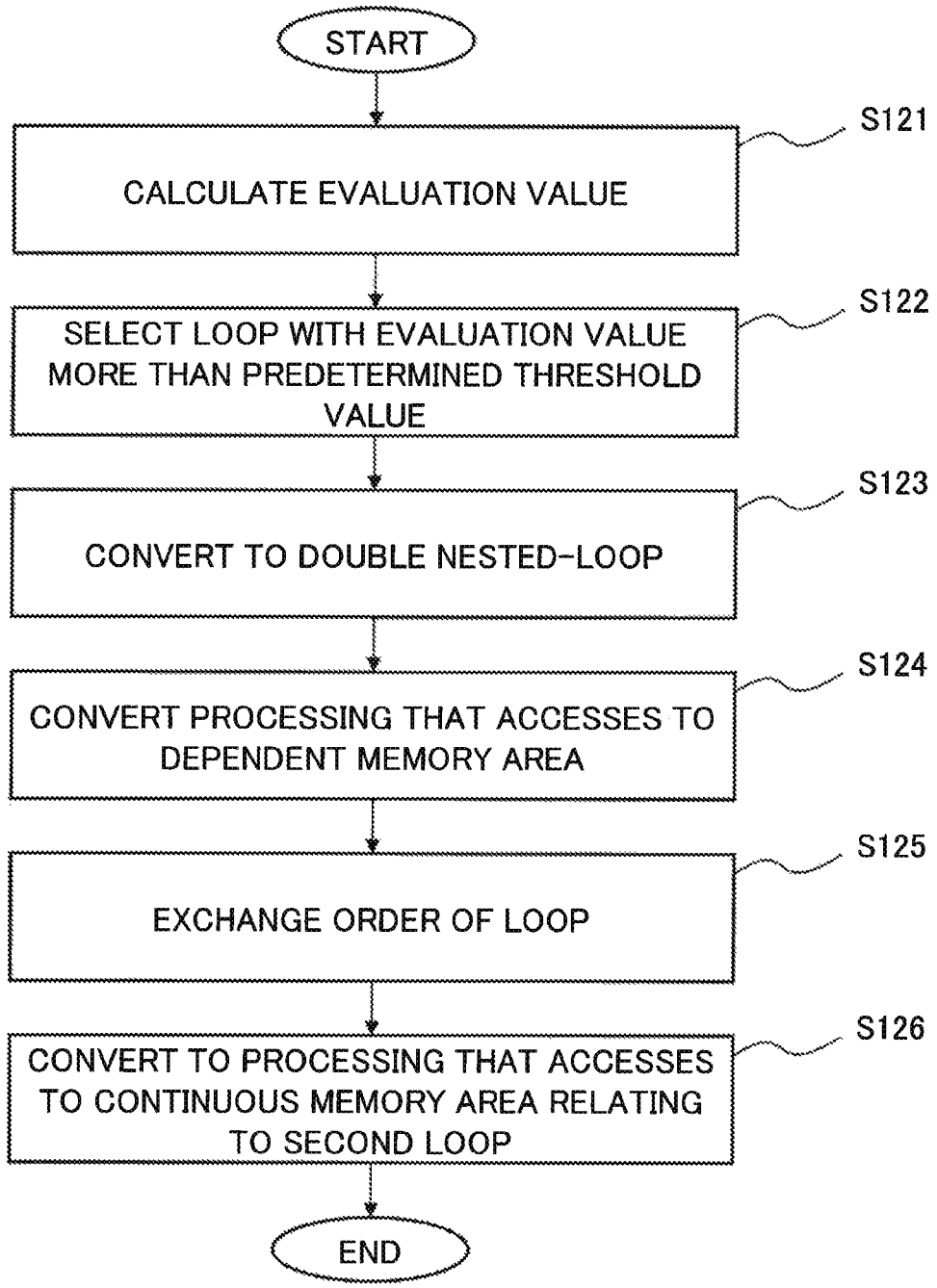
FIG. 4 is a flowchart illustrating a flow of processing in the program conversion unit according to the first example embodiment.

Processing in the program conversion unit 104 according to the first example embodiment will be described with reference to FIG. 4. FIG. 4 is a flowchart illustrating a flow of processing in the program conversion unit 104 according to the first example embodiment.

The loop selection unit 103 calculates an evaluation value indicating a value acquired by dividing an ideal expected vectorization-efficiency by an ordinary vectorization-efficiency regarding respective inner processing in a program (Step S121). In this case, the evaluation value indicates a value acquired by multiplying an efficiency improvement degree relating to the program by an above-described possibility. The larger the evaluation value is, the larger the efficiency improvement degree is. The smaller the evaluation value is, the smaller the efficiency improvement degree is. For example, in a case of an outer loop constituted by inner processing that access a discontinuous memory area, a value acquired by dividing an ideal vectorization-efficiency by an ordinary vectorization-efficiency is same (or substantially same) with respect to different inner processing. Therefore, the evaluation value increases, as a possibility that inner processing is executed increases. An evaluation value to be calculated in accordance with the above-described processing is a small value when being accessed to a continuous memory area in inner processing, as compared with when not being accessed to; and is a value that decreases, as the number of times of determination processing via which the inner processing is executed increases.

The loop selection unit 103 determines whether or not a calculated evaluation value satisfies a predetermined condition. For example, a predetermined condition is based on whether or not a value exceeds a predetermined threshold value. The loop selection unit 103 selects inner processing having an evaluation value relating to the inner processing larger than a predetermined threshold value among a plurality of inner processing (specifically, loops) included in a program (Step S122). The loop selection unit 103 does not select inner processing, when a program does not include inner processing having an evaluation value relating to the inner processing larger than a predetermined threshold value. The loop selection unit 103 may generate selection information (which will be described later with reference to FIG. 14) indicating a result of processing illustrated in Step S121 and Step S122.

The program conversion unit 104 converts an outer loop including inner processing selected by the loop selection unit 103 to a program (which will be described later with reference to FIG. 8 and FIG. 9) including a double nested-loop i.e. a loop being a value of an integer such that a value of a loop variable capable of storing a value depending on iteration numbers relating to an inner loop in the double nested-loop is continuous (Step S123). In this case, the program conversion unit 104 converts termination determination processing of determining whether or not the iteration processing is terminated to termination determination processing of simultaneously terminating double nested-loop processing after conversion in an outer loop. Hereinafter, for convenience of description, in a double nested-loop, an inner loop is referred to as a "first loop", and an outer loop is referred to as a "second loop". In other words, the program conversion unit 104 converts a program including an outer loop to a program being processing of executing a first loop inside of a second loop, and in which inner processing is executed inside of the first loop. Further, the program conversion unit 104 converts to a program in which a continuous integer value is set as a loop variable capable of storing a value depending on the number of iterations in a first loop.

For example, when the number of iterations in an outer loop is N (where N is a natural number), the program conversion unit 104 converts to a program (which will be described later with reference to FIG. 8 and FIG. 9) in which a first loop in which processing is repeated T times (where T is a natural number of 2 or larger, N=S×T) is executed in a second loop in which processing is repeated S times (where S is a natural number of 2 or larger).

In respective example embodiments of the present invention, for convenience of description, it is assumed that "N=S×T" is satisfied. The program conversion unit 104, however, may calculate S, T, and R that satisfy "N=S×T+R" (where R is a positive integer). In this case, the program conversion unit 104 converts an outer loop to a first loop in which processing is repeated T times in a second loop in which processing is repeated S times, and to iteration processing of iterating processing R times.

Next, the loop exchanging unit 108 determines whether or not variables (or an array) to be referred to in respective second loops of a program (exemplified in FIG. 8 and FIG. 9) that is output as a result of conversion processing in Step S123 has a dependency. Herein, a dependency indicates that certain processing stores a calculated value to a memory area and processing after the certain processing refers to the memory area. In other words, dependency indicate a relation between the certain processing and the processing after the certain processing. The loop exchanging unit 108 converts processing that accesses to a variable (in other words, a memory area) determined to have a dependency to a program (which will be described later with reference to FIG. 10 and FIG. 11) including processing that accesses memory areas determined in accordance with values of loop variable capable of storing a value depending on iteration numbers in a second loop (Step S124).

Next, the loop exchanging unit 108 converts a program (exemplified in FIG. 10 and FIG. 11) output as a result of conversion processing in Step S124 to a program that includes a second loop. The second loop includes a first loop which executes respective inner processing. The second loop also includes a first loop which executes respective termination determination processing. Specifically, the loop dividing unit 106 exchanges the order of loops regarding a loop in the inner processing, and a second loop (Step S125).

Next, the variables reallocating unit 109 converts a program output as a result of conversion processing in Step S125 to a program (which will be described later with reference to FIG. 12 and FIG. 13) in which a memory area different for each loop variable capable of storing a value depending on the number of iterations relating to a second loop is reallocated to a memory area continuous regarding a value of the loop variable (specifically, a processing order relating to a second loop) (Step S126). For example, when a memory area different for each value M of a loop variable capable of storing a value depending on the number of iterations in a second loop is a[M][N] (where N is a natural number), the variables reallocating unit 109 converts to a program including processing in which a memory area is converted to a memory area a[N][M] being a memory area continuous regarding a processing order relating to a second loop.

Selection information will be described with reference to FIG. 14. FIG. 14 is a diagram conceptually illustrating an example of selection information.

In selection information, an ordinary vectorization-efficiency, an ideal expected vectorization-efficiency, an evaluation value to be calculated based on the two vectorization efficiencies, and information indicating whether or not the evaluation value exceeds a predetermined threshold value (information indicated by "select or not") are associated with each other.

In selection information exemplified in FIG. 14, an ordinary vectorization-efficiency "1.0", an ideal expected vectorization-efficiency "4.0", an evaluation value "4.0", and "select or not" "select" are associated with one another. This represents that the evaluation value "4.0" is calculated based on the ideal expected vectorization-efficiency "4.0" and the ordinary vectorization-efficiency "1.0". This also represents that the evaluation value "4.0" is selected since the evaluation value "4.0" exceeds a predetermined threshold value (e.g. "3.0").

In selection information exemplified in FIG. 14, an ordinary vectorization-efficiency "1.0", an ideal expected vectorization-efficiency "1.2", an evaluation value "1.2", and "select or not" "not select" are associated with one another. This represents that the evaluation value "1.2" is calculated based on the ideal expected vectorization-efficiency "1.2" and the ordinary vectorization-efficiency "1.0". This also represents that the evaluation value "1.2" is not selected since the evaluation value "1.2" does not exceed a predetermined threshold value (e.g. "3.0").

A program output as a result of conversion processing in Step S123, Step S124, and Step S126 will be described with reference to FIGS. 8 to 13.

Figure 9:
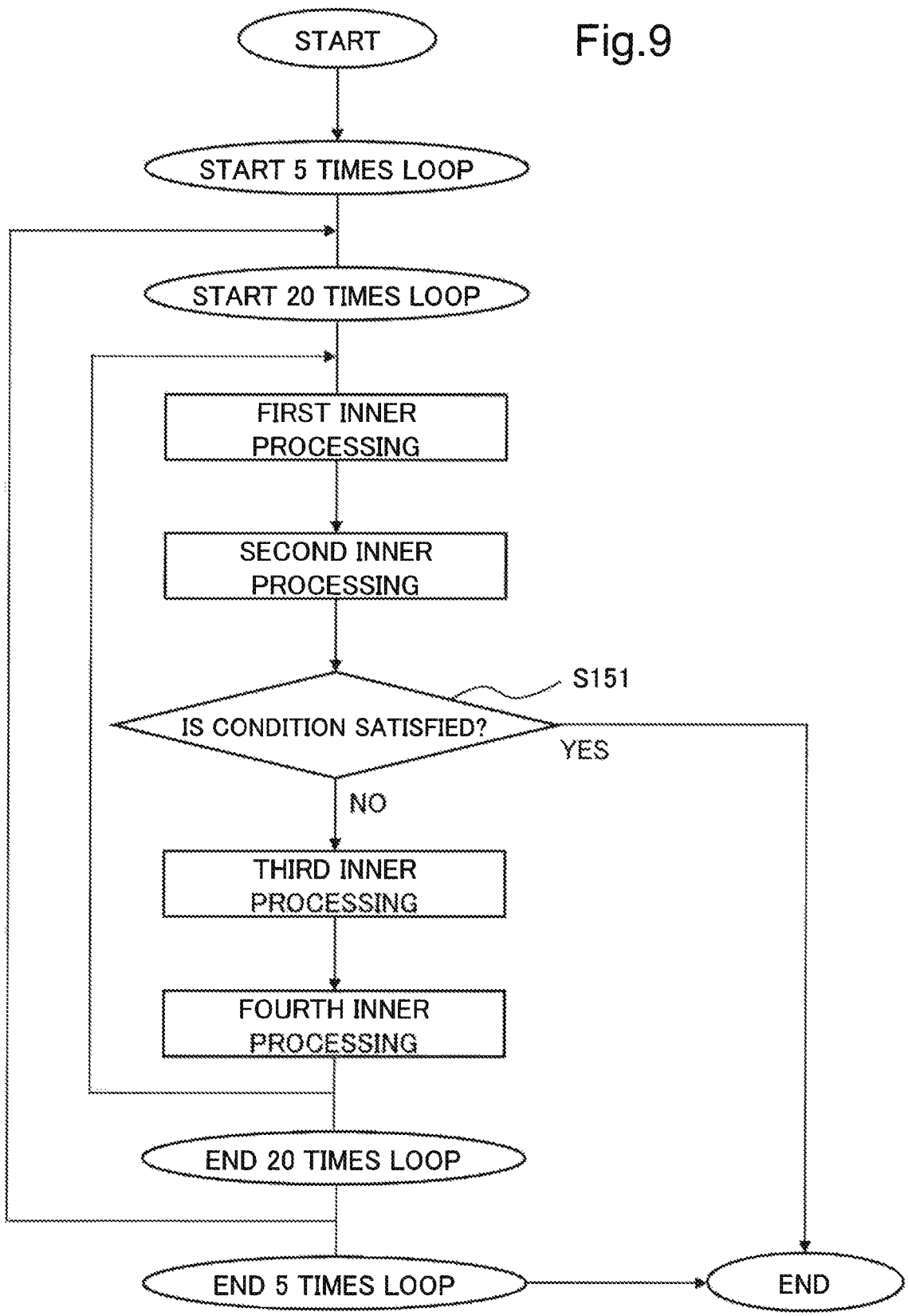
FIG. 9 is a flowchart illustrating a flow of processing in a program output as a result of conversion processing in Step S123.

A program output as a result of conversion processing in Step S123 (FIG. 4) will be described with reference to a program exemplified in FIG. 8, and a flowchart (FIG. 9) illustrating a flow of processing in the program. FIG. 8 is a diagram illustrating an example of a program output as a result of conversion processing in Step S123. FIG. 9 is a flowchart illustrating a flow of processing in a program output as a result of conversion processing in Step S123.

In FIG. 8, an instruction "for" indicates loop processing. In a program exemplified in FIG. 8, a second loop is processing indicated by "for(i1=0;i1<100;i1+=20)", and a loop variable capable of storing a value depending on iteration numbers in the second loop is "i1". A first loop is processing indicated by "for(ii=0;ii<20;ii++)", and a loop variable capable of storing a value depending on iteration numbers in the first loop is "ii". Inner processing is processing indicated by "for(i2=0;i2<100;i2++)", and processing indicated by "for(i3=0;i3<20;i3++)". A loop variable constituting inner processing "for(i2=0;i2<100;i2++)" is "i2". A loop variable constituting inner processing "for (i3=0;i3<20;i3++)" is "i3". Termination determination processing is processing indicated by "if (v1>TH1) goto_LABEL".

Processing relating to an outer loop "for(i1=0;i1<100; i1++)" (FIG. 5) is converted to a second loop "for(i1=0; i1<100;i1+=20)", and a first loop "for(ii=0;ii<20;ii++)".

In a program illustrated in FIG. 8, processing "a1[i2]=a0 [i2]*dx[i1+ii]" indicates processing in which a value is stored in a memory area "a1[i2]". Further, processing "a2 [i2]=a0[i2]*dy[i1+ii]" indicates processing in which a value is stored in a memory area "a2[i2]". Therefore, inner processing "for(i2=0;i2<100;i2++)" includes processing in which a value is stored in a memory area "a1[i2]", and processing in which a value is stored in a memory area "a2[i2]". Further, processing "v1+=a1[a3[i3]]−a2[a3[i3]]" indicates processing in which a value stored in a memory area "v1" and a value stored in a memory area "a1[i3]" are added, and a result acquired by subtracting, from the addition result, a value stored in a memory area "a2[i3]" is stored in the memory area "v1". Therefore, there is a dependency between inner processing "for(i2=0;i2<100;i2++)" and inner processing "for(i3=0;i3<20;i3++)", since a calculation result in inner processing "for(i2=0;i2<100;i2++)" is accessed in inner processing "for(i3=0;i3<20;i3++)". Likewise, a memory area "v1" in which a value calculated in inner processing "for(i2=0;i2<100;i2++)" is stored is accessed in termination determination processing "if (v1>TH1) goto_ LABEL". Therefore, there is a dependency between inner processing "for(i2=0;i2<100;i2++)" and termination determination processing "if (v1>TH1) goto_LABEL".

Referring to FIG. 9, processing defined by "start 5 times loop" and "end 5 times loop" indicates a second loop "for(i1=0;i1<100;i1+=20)" exemplified in FIG. 8. Processing defined by "start 20 times loop" and "end 20 times loop" indicates a first loop "for(ii=0;ii<20;ii++)" exemplified in FIG. 8. First inner processing indicates inner processing "for(i2=0:i2<100;i2++)" exemplified in FIG. 8. Second inner processing indicates inner processing "for(i3=0;i3<20; i3++)" exemplified in FIG. 8. Processing illustrated in Step S151 indicates termination determination processing "if (v1>TH1)goto_LABEL". In FIG. 9, third inner processing and fourth inner processing are illustrated. Alternatively, a program illustrated in FIG. 8 may further include many processing. A program is not limited to the example illustrated in FIG. 8 or FIG. 9.

Figure 11:
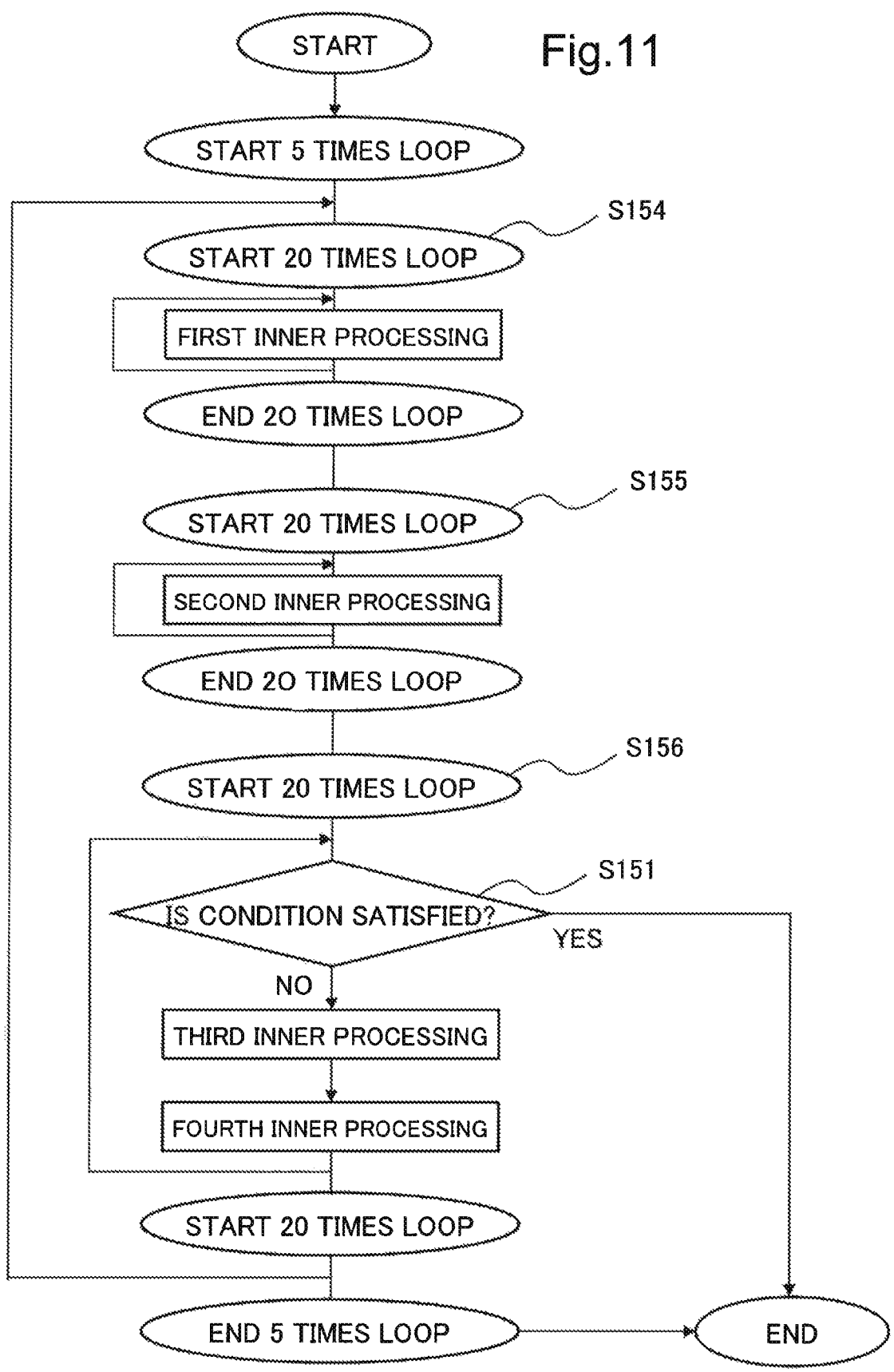
FIG. 11 is a flowchart illustrating a flow of processing in a program output as a result of conversion processing in Step S124.

A program output as a result of conversion processing in Step S124 (FIG. 4) will be described with reference to FIG. 10 and FIG. 11. FIG. 10 is a diagram illustrating an example of a program output as a result of conversion processing in Step S124. FIG. 11 is a flowchart illustrating a flow of processing in a program output as a result of conversion processing in Step S124.

As illustrated in FIG. 10, a program described with reference to FIG. 8 is converted to a program in which three loop processing to be described later are executed in a second loop "for(i1=0;i1<100;i1+=20)". Specifically, Inner processing "for(i2=0;i2<100;i2++)" is executed in a first loop "for(ii=0;ii<20;ii++)".

Inner processing "for(i3=0;i3<20;i3++)" is executed in a first loop "for(ii=0;ii<20;ii++)".

Termination determination processing "if(v1[ii]> TH1)_goto_LABEL" is executed in a first loop "for (ii=0;ii<20;ii++)".

Further, processing in which a value is stored in a memory area "a1[i2]" illustrated in FIG. 8 is converted to processing in which a value is stored in memory areas "a1[ii][i2]", which is different for each loop variable "ii" constituting a first loop "for(ii=0;ii<20;ii++)" as illustrated in FIG. 10. Likewise, as illustrated in FIG. 10, processing "a1[a3[i3]]− a2[a3[i3]]" in which data stored in a memory area "a1[i2]" illustrated in FIG. 8 is referred to is converted to memory areas "a1[ii][a3[i3]]−a2[ii][a3[i3]]", which is different for each loop variable "ii" capable of storing a value depending on the number of iterations in a first loop. Likewise, as illustrated in FIG. 10, processing in which a value is stored in a memory area "v1" illustrated in FIG. 8 is converted to processing in which a value is stored in memory areas "v1[ii]", which is different for each loop variable "ii" constituting a first loop "for(ii=0;ii<20;ii++)".

However, in FIG. 10, memory areas "a1[ii][i2]" are discontinuous memory areas regarding a loop variable "ii" constituting a first loop "for(ii=0;ii<20;ii++)". Likewise, memory areas "a2[ii][i2]" are discontinuous memory areas regarding a loop variable "ii" constituting a first loop "for(ii=0;ii<20;ii++)".

Referring to FIG. 11, processing defined by "start 5 times loop" and "end 5 times loop" indicates a second loop "for(ii=0;i1<100;i1+=20)" illustrated in FIG. 10. Processing defined by "start 20 times loop" (any of Step S154 to Step S156) and "end 20 times loop" indicates a first loop "for (ii=0;ii<20;ii++)" illustrated in FIG. 10. First inner processing indicates inner processing "for(i2=0;i2<100;i2++)" illustrated in FIG. 10. Second inner processing indicates inner processing "for(i3=0;i3<20;i3++)" illustrated in FIG. 10. Processing illustrated in Step S151 indicates termination determination processing "if(v1[ii]<TH1)goto_LABEL". In FIG. 11, third inner processing and fourth inner processing are illustrated. Alternatively, a program illustrated in FIG. 10 may further include more processing. A program to be input to the program conversion device 101 is not limited to the example illustrated in FIG. 10 or FIG. 11.

Figure 13:
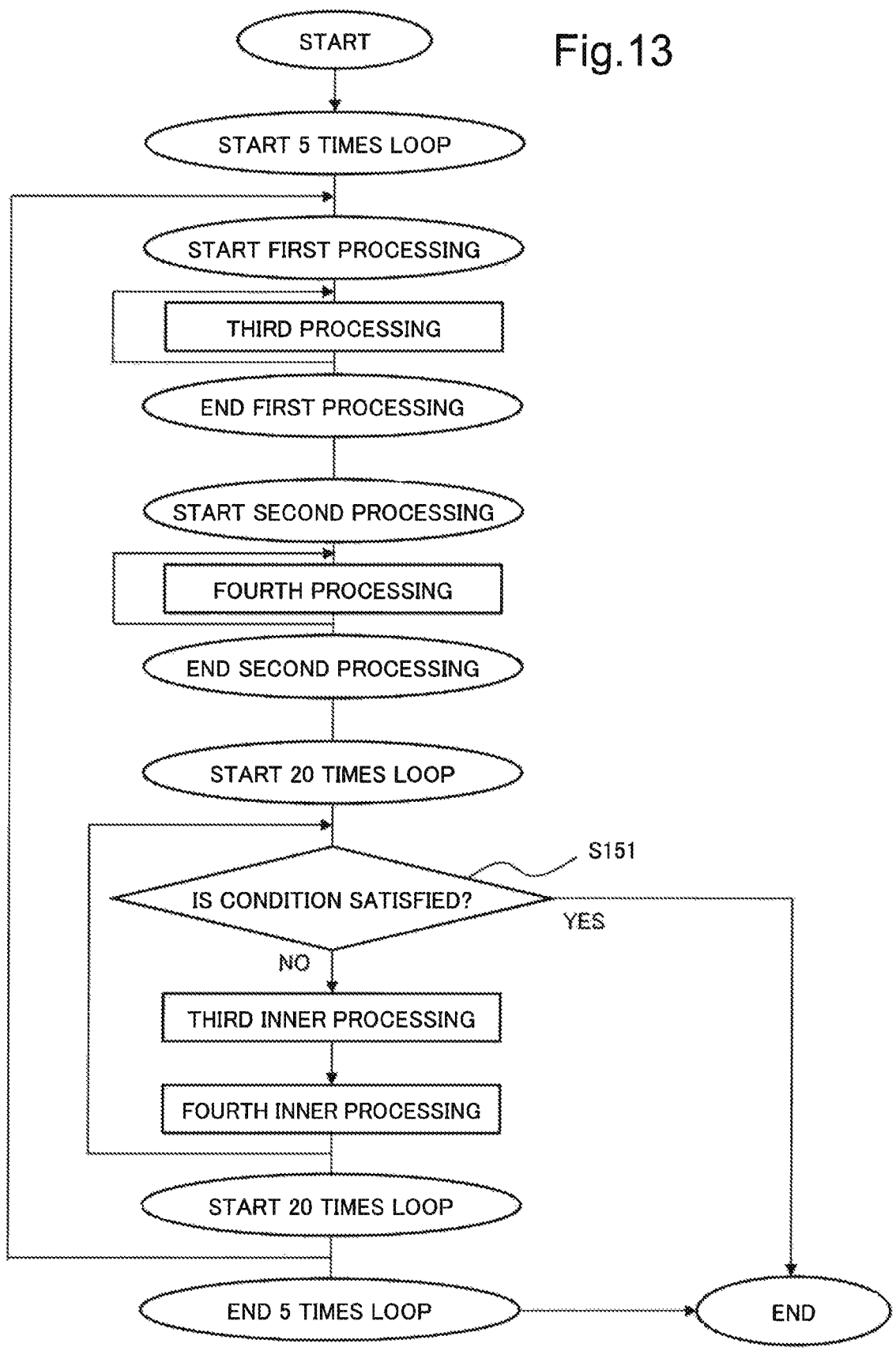
FIG. 13 is a flowchart illustrating a flow of processing in a program output as a result of conversion processing in Step S126.

A program output as a result of conversion processing in Step S126 (FIG. 4) will be described with reference to FIG. 12 and FIG. 13. FIG. 12 is a diagram illustrating an example of a program output as a result of conversion processing in Step S126. FIG. 13 is a flowchart illustrating a flow of processing in a program output as a result of conversion processing in Step S126.

As illustrated in FIG. 12, a program described with reference to FIG. 10 is converted to a program in which a first loop "for(ii=0;ii<20;ii++)" is executed in inner processing "for(i2=0;i2<100;i2++)". Likewise, a program illustrated in FIG. 10 is converted to a program in which a first loop "for(ii=0;ii<20;ii++)" is executed in inner processing "for(i3=0;i3<20;i3++)".

Further, in a program exemplified in FIG. 12, a memory area "a1[ii][i2]" is further converted to a continuous memory area "a1[i2][ii]" regarding a loop variable "ii" constituting a first loop "for(ii=0;ii<20;ii++)". Likewise, in a program exemplified in FIG. 12, a memory area "a2[ii][i2]" is further converted to a continuous memory area "a2[i2][ii]" regarding a loop variable "ii" constituting a first loop "for(ii=0;ii<20;ii++)".

Further, similar description is also applied to a memory area "a1[ii][a3[i3]]" (FIG. 10) referred to in inner processing "for(i3=0;i3<20;i3++)". Specifically, as illustrated in FIG. 12, a memory area "a1[ii][a3[i3]]" is converted to a continuous memory area "a1[a3[i3]][ii]" regarding a loop variable "ii" constituting a first loop "for(ii=0;ii<20;ii++)". Further, as illustrated in FIG. 12, a memory area "a2[ii][a3[i3]]" (FIG. 10) is converted to a continuous memory area "a2[a3[i3]][ii]" regarding a loop variable "ii" constituting a first loop "for(ii=0;ii<20;ii++)".

Referring to FIG. 13, processing defined by "start 5 times loop" and "end 5 times loop" indicates a second loop "for(i1=0;i1<100;i1+=20)" exemplified in FIG. 12. Processing defined by "start first processing" and "end first processing" indicates inner processing "for(i2=0;i2<100;i2++)" illustrated in FIG. 12. Third processing indicates a first loop "for(ii=0;ii<20;ii++)" illustrated in FIG. 12. Processing defined by "start second processing" and "end second processing" indicates inner processing "for(i3=0;i3<20;i3++)" exemplified in FIG. 12. Fourth processing indicates a first loop "for(ii=0;ii<20;ii++)". Processing illustrated in Step S151 indicates determination processing "if(v1[ii]>TH1) goto_LABEL". Processing defined by "start 20 times loop" and "end 20 times loop" indicates a first loop "for(ii=0; ii<20;ii++)" illustrated in FIG. 12. In FIG. 13, third inner processing and fourth inner processing are illustrated. Alternatively, a program illustrated in FIG. 12 may further include more processing. A program to be input to the program conversing device 101 is not limited to the example illustrated FIG. 12 or FIG. 13.

Next, advantageous effects relating to the program conversion device 101 according to the first example embodiment will be described.

The program conversion device 101 according to the first example embodiment can convert even a program including a loop having termination processing to a quick program executable by an information processing device including a vector processor. A reason for this is that even a program including inner processing and termination determination processing is converted to a program that accesses to a value stored in a continuous memory area regarding a loop variable ("ii" in a case of the above-described example) capable of storing a value depending on iteration numbers in an innermost loop after conversion (in a case of the above-described example, "for(ii=0;ii<20;ii++)". A reason for this will be described in detail.

As described above, an information processing device including a vector processor is able to quickly execute arithmetic processing which refers to a value stored in a continuous memory area regarding a value of a loop variable capable of storing a value depending on iteration numbers in a loop. However, an information processing device including a vector processor is unable to quickly execute arithmetic processing which refers to a value stored in a discontinuous memory area regarding a value of a loop variable capable of storing a value depending on iteration numbers in a loop.

Termination determination processing includes arithmetic processing which refers to a value stored in a discontinuous memory area regarding a value of a loop variable capable of storing a value depending on iteration numbers in a loop. Therefore, a compiler disclosed in PTL 1 or PTL 2 is unable to convert a termination program to a quick program executable by an information processing device including a vector processor.

Further, the program conversion device 101 according to the present example embodiment does not bring about a long processing time in an information processing device even in case of loop processing causing long processing time in a vector processor. A reason for this is that when an evaluation value relating to respective inner processing is equal to or smaller than a predetermined threshold value, the loop selection unit 103 does not select the inner processing. In this case, a long processing time increases does not occur, since the program conversion device 101 does not convert inner processing of a low degree of improvement.

Second Example Embodiment

Next, a second example embodiment of the present invention based on the first example embodiment will be described.

In the following description, a configuration according to the present example embodiment will be mainly described, and overlapping description on similar configuration to those in the first example embodiment will be omitted by providing same reference numbers.

Figure 15:
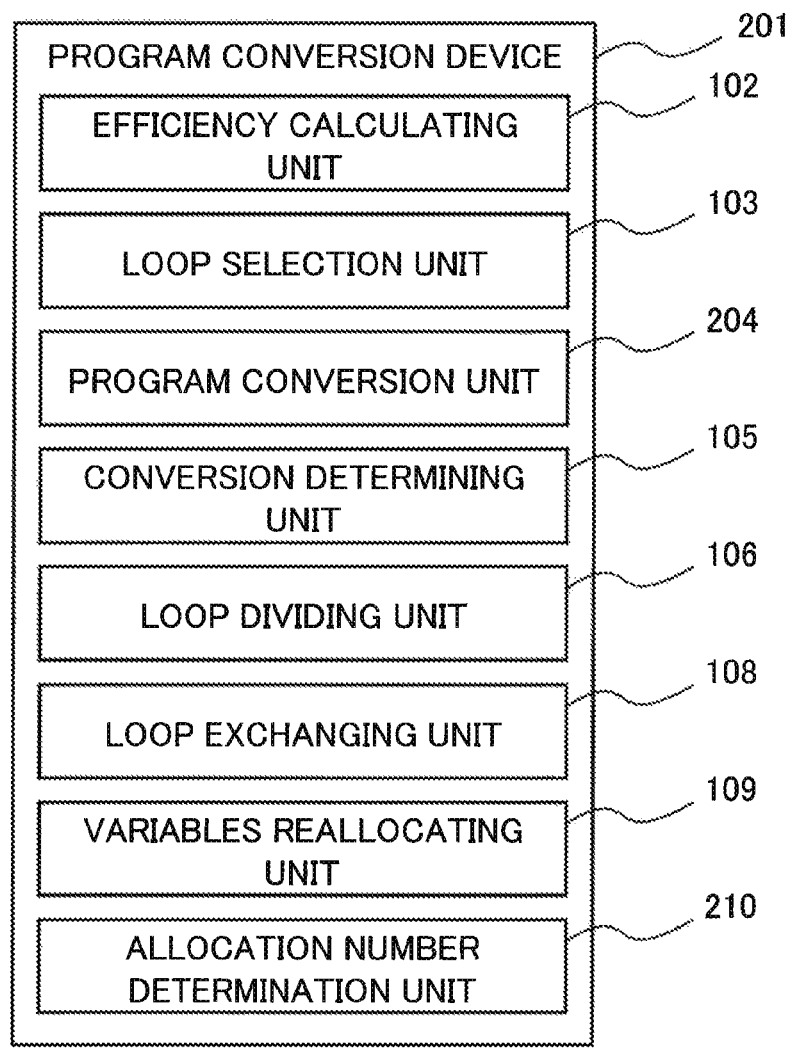
FIG. 15 is a block diagram illustrating a configuration of a program conversion device according to a second example embodiment of the present invention.

A configuration of a program conversion device 201 according to the second example embodiment of the present invention will be described in detail with reference to FIG. 15. FIG. 15 is a block diagram illustrating a configuration of the program conversion device 201 according to the second example embodiment of the present invention.

The program conversion device 201 according to the second example embodiment includes an efficiency calculating unit (efficiency calculator) 102, a loop selection unit (loop selector) 103, a program conversion unit (program converter) 204, a conversion determination unit (conversion determiner) 105, a loop dividing unit (loop divider) 106, a loop exchanging unit (loop exchanger) 108, a variables reallocating unit (variables re-allocator) 109, and an allocation number determination unit (allocation number determiner) 210.

The program conversion device 201 inputs (receives) a program such as a termination program, and outputs an object program including vectorized termination program.

Figure 16:
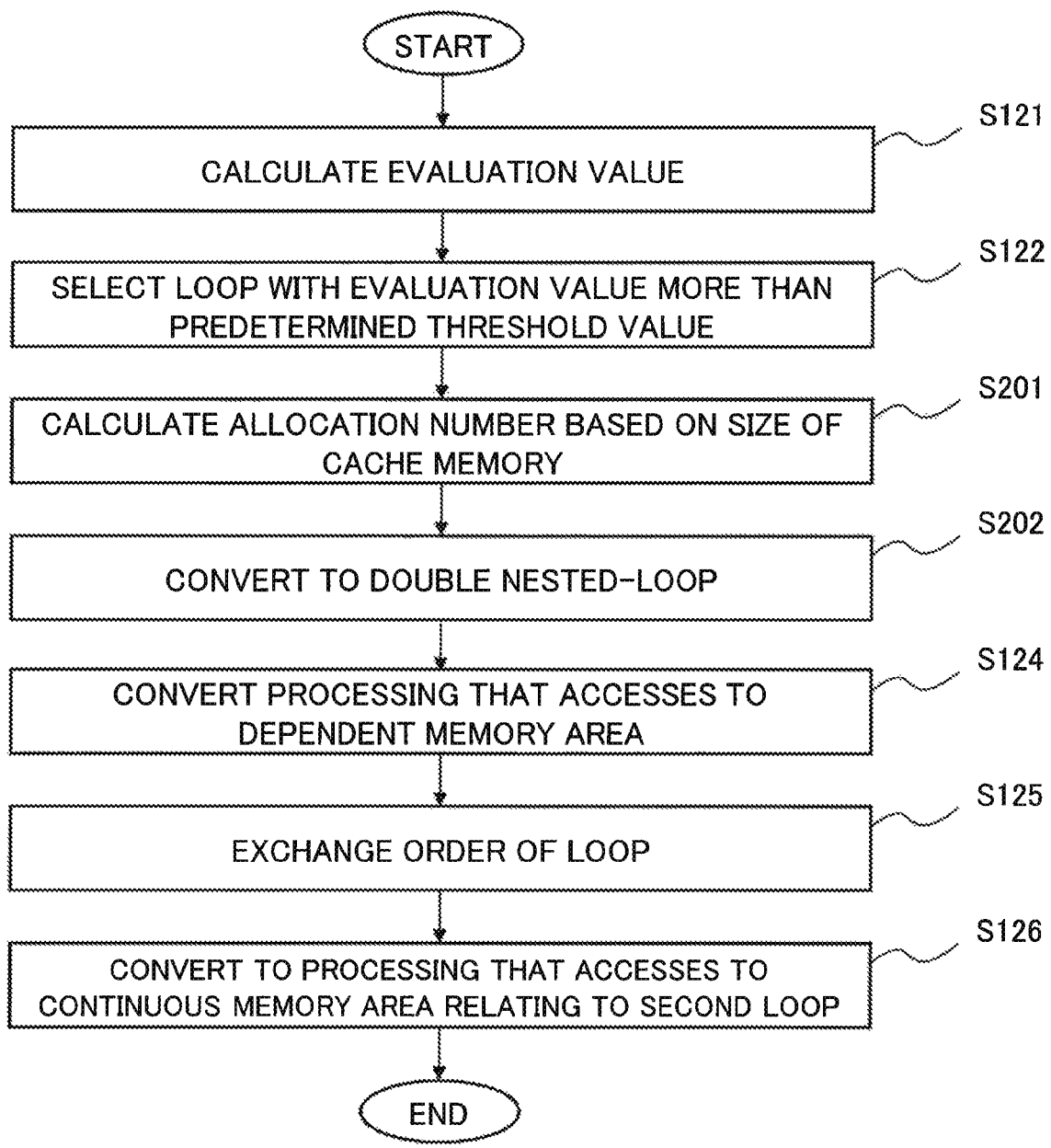
FIG. 16 is a flowchart illustrating a flow of processing in the program conversion device according to the second example embodiment.

Next, processing in the program conversion device 201 according to the second example embodiment of the present invention will be described in detail with reference to FIG. 16. FIG. 16 is a flowchart illustrating a flow of processing in the program conversion device 201 according to the second example embodiment.

The loop selection unit 103 calculates an evaluation value relating to inner processing included in an input program by executing similar processing to processing illustrated in FIG. 4 (Step S121). The loop selection unit 103 selects inner processing (specifically, a loop) with an evaluation value relating to the inner processing more than a predetermined threshold value among inner processing included in a program (Step S122).

Next, the allocation number determination unit 210 calculates the number of pieces of data that are accessed in inner processing included in an outer loop including inner processing selected in Step S122. The allocation number determination unit 210 calculates total sum of number of pieces of data calculated relating to the outer loop. The allocation number determination unit 210 calculates the number of iterations (hereinafter, referred to as an "allocation number") in a second loop, when an outer loop is converted to a double nested-loop by dividing a size of a cache memory included in an information processing device for executing an object program after conversion, by a calculated total sum (Step S201). When an allocation number is not an integer, the allocation number determination unit 210 may truncate the allocation number after a decimal point.

The program conversion unit 204 calculates the number of iterations in a first loop by dividing the number of iterations set by using a loop variable of outer loop processing, by an allocation number calculated by the allocation number determination unit 210. The program conversion unit 204 converts the outer loop processing to processing in which a second loop that is executed for the number of iterations corresponding to the allocation number calculated by the allocation number determination unit 210 is repeated the calculated number of iterations in a first loop (Step S202).

Next, advantageous effects relating to the program conversion device 201 according to the second example embodiment will be described.

The program conversion device 201 according to the present example embodiment can convert even a program including a loop having termination determination processing to a quick program executable by an information processing device including a vector processor. A reason for this is a similar reason to the reason described above in the first example embodiment.

Further, the program conversion device 201 according to the present example embodiment can convert an input program to a quick program executable in an information processing device including a vector processor and a cache memory. A reason for this is that the allocation number determination unit 210 determines an allocation number in such a manner that a cache memory for relaying data between a memory and a vector register processes data of a storable size in a second loop. Therefore, the information processing device is able to input and output data regarding continuous inner processing by accessing to data stored in a cache memory.

Third Example Embodiment

Next, a third example embodiment of the present invention based on the first example embodiment will be described.

In the following description, a configuration according to the present example embodiment will be mainly described, and overlapping description on similar components to those in the first example embodiment will be omitted by providing same reference numbers.

Figure 17:
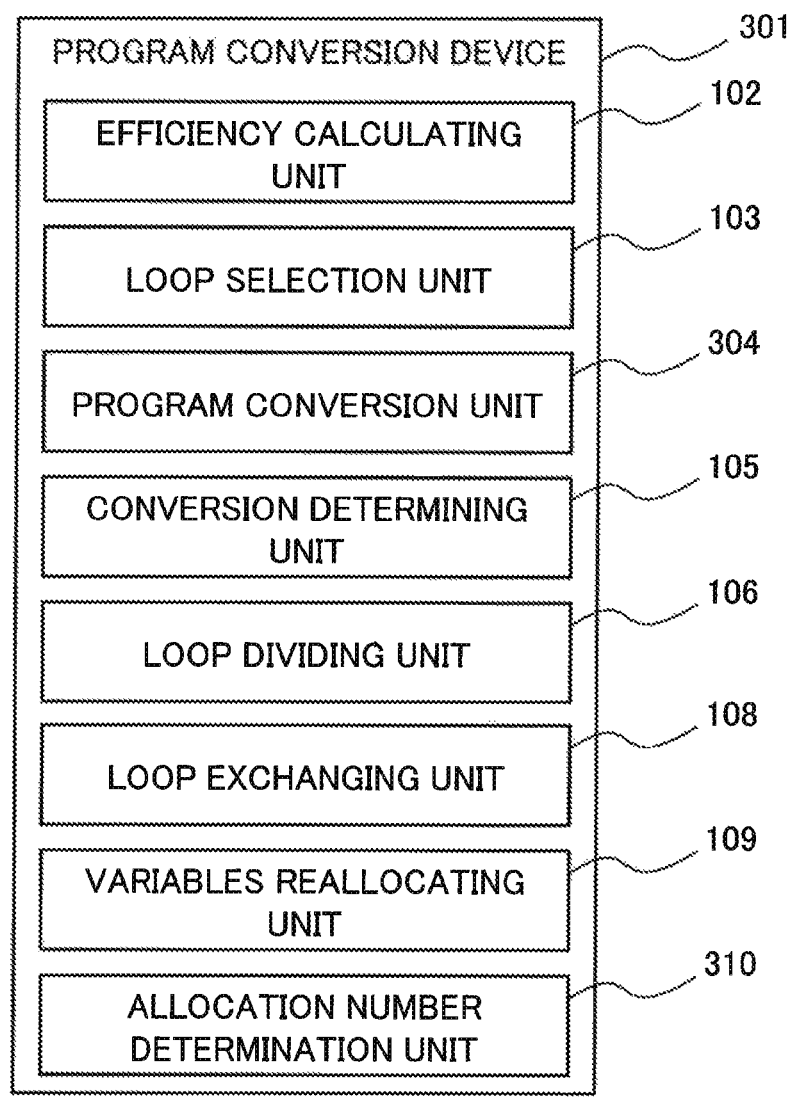
FIG. 17 is a block diagram illustrating a configuration of a program conversion device according to a third example embodiment of the present invention.

A configuration of a program conversion device 301 according to the third example embodiment of the present invention will be described in detail with reference to FIG. 17. FIG. 17 is a block diagram illustrating a configuration of the program conversion device 301 according to the third example embodiment of the present invention.

The program conversion device 301 according to the third example embodiment includes an efficiency calculating unit (efficiency calculator) 102, a loop selection unit (loop selector) 103, a program conversion unit (program converter) 304, a conversion determination unit (conversion determiner) 105, a loop dividing unit (loop divider) 106, a loop exchanging unit (loop exchanger) 108, a variables reallocating unit (variables re-allocator) 109, and an allocation number determination unit (allocation number determiner) 310.

The program conversion device 301 inputs a program such as a termination program, and outputs an object program including the vectorized termination program.

Figure 18:
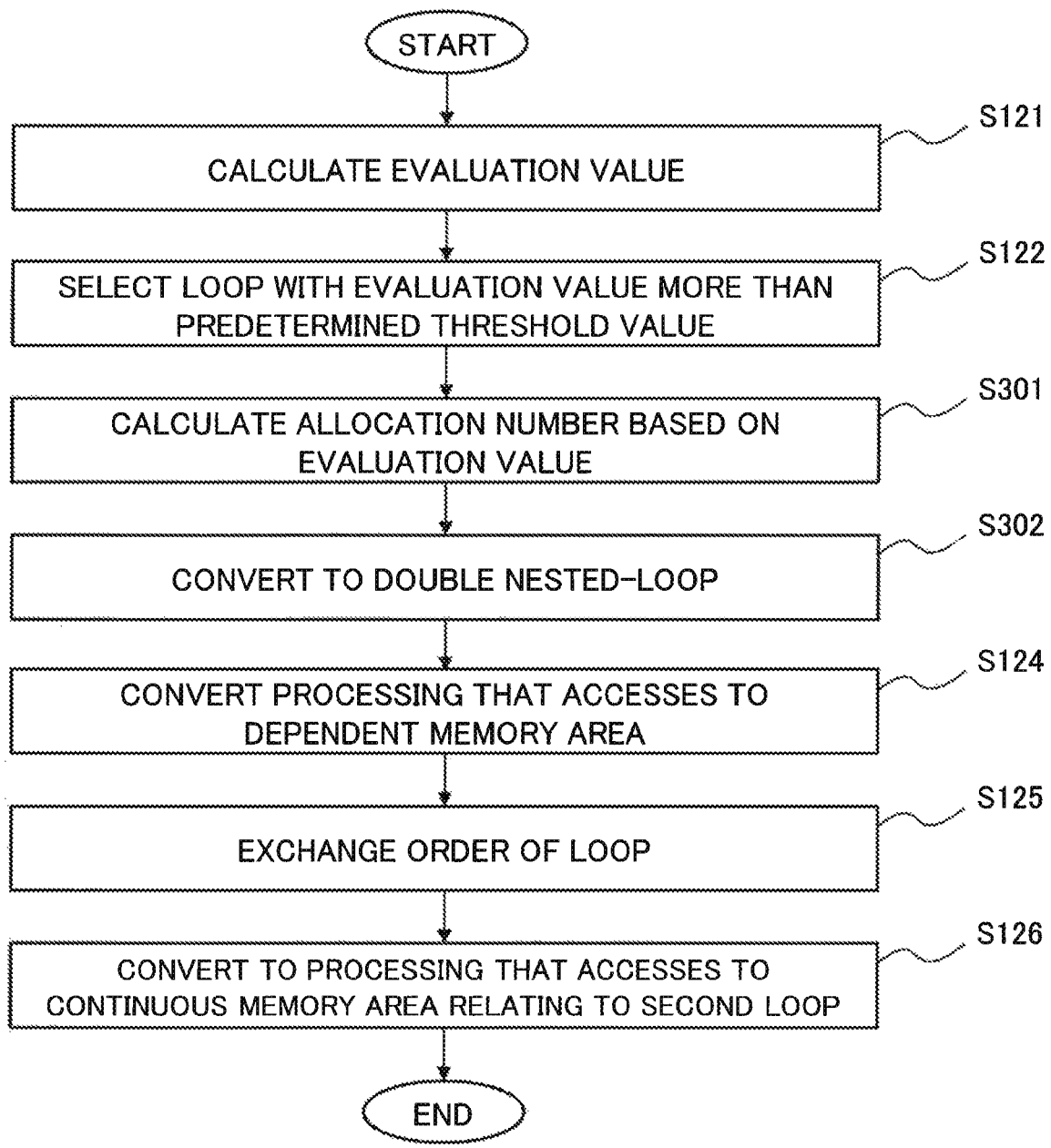
FIG. 18 is a flowchart illustrating a flow of processing in the program conversion device according to the third example embodiment.

Next, processing in the program conversion device 301 according to the third example embodiment of the present invention will be described in detail with reference to FIG. 18. FIG. 18 is a flowchart illustrating a flow of processing in the program conversion device 301 according to the third example embodiment.

The loop selection unit 103 calculates an evaluation value relating to inner processing included in an input program by executing similar processing to processing illustrated in FIG. 4 (Step S121). The loop selection unit 103 selects inner processing (specifically, a loop) with an evaluation value relating to the inner processing more than a predetermined threshold value among inner processing included in a program (Step S122).

Next, the allocation number determination unit 310 calculates an allocation number being the number of iterations in a second loop, when an outer loop is converted to a double nested-loop, based on the evaluation value calculated by the loop selection unit 103 (Step S301). In this case, the allocation number determination unit 310 calculates an allocation number in accordance with a predetermined calculation procedure. As described above, since an evaluation value indicates an efficiency improvement degree relating to the program, the predetermined calculation procedure includes calculating a value sufficiently larger than a vector processor length, calculating a value that increases as an evaluation value increases, and calculating a value that decreases as an evaluation value decreases, for example.

The program conversion unit 304 calculates the number of iterations in a first loop by dividing the number of iterations set by using a loop variable of outer loop processing by the allocation number calculated by the allocation number determination unit 310. The program conversion unit 304 converts the outer loop processing to processing in which a second loop that is executed for the number of iterations corresponding to an allocation number calculated by the allocation number determination unit 310 is repeated the calculated number of iterations in a first loop (Step S302).

Next, advantageous effects relating to the program conversion device 301 according to the third example embodiment will be described.

The program conversion device 301 according to the present example embodiment can convert even a program including a loop having termination determination processing to a quick program executable by an information processing device including a vector processor. A reason for this is a similar reason to the reason described above in the first example embodiment.

Further, the program conversion device 301 according to the present example embodiment can convert to a program with further high efficiency. A reason for this is that the allocation number determination unit 310 calculates a value as an allocation number that increases, as an evaluation value increases. The allocation number determination unit 310 calculates a value such that the number of iterations in a second loop increases as an efficiency improvement degree relating to a program increases. As a result, a continuous memory area increases.

Consequently, an information processing device including a vector processor is able to quickly execute an object program generated by the program conversion device 301.

Fourth Example Embodiment

Next, a fourth example embodiment of the present invention based on the third example embodiment will be described.

In the following description, a configuration according to the present example embodiment will be mainly described, and overlapping description on similar configuration to those in the third example embodiment will be omitted by providing same reference numbers.

Figure 19:
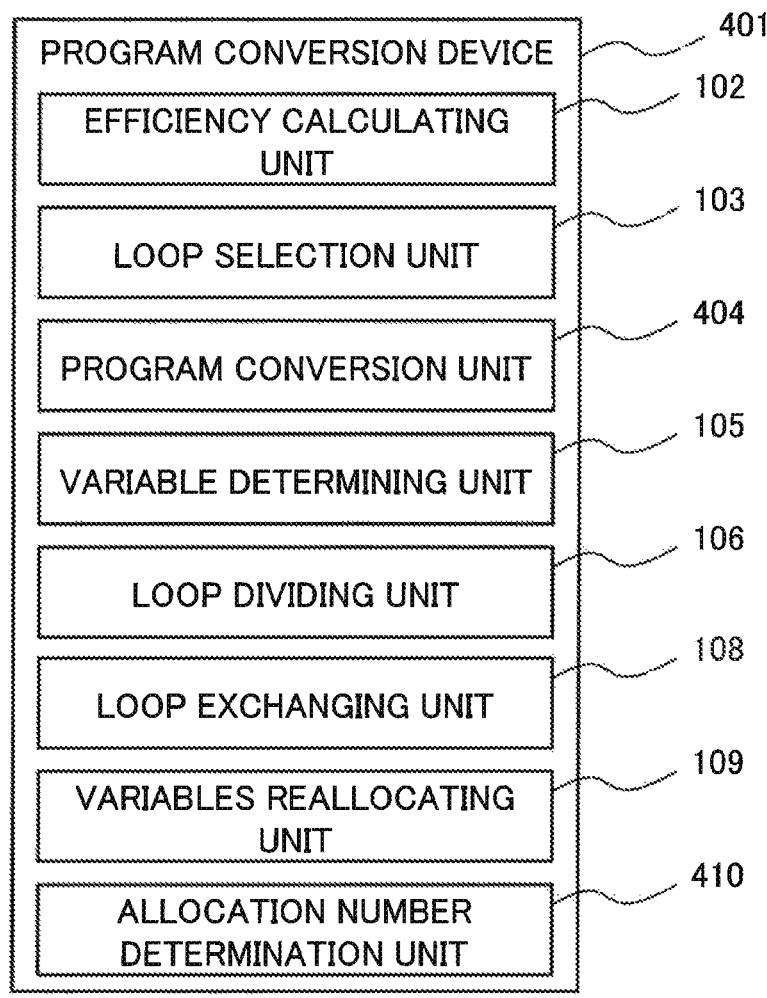
FIG. 19 is a block diagram illustrating a configuration of a program conversion device according to a fourth example embodiment of the present invention.

A configuration of a program conversion device 401 according to the fourth example embodiment of the present invention will be described in detail with reference to FIG. 19. FIG. 19 is a block diagram illustrating a configuration of the program conversion device 401 according to the fourth example embodiment of the present invention.

The program conversion device 401 according to the fourth example embodiment includes an efficiency calculating unit (efficiency calculator) 102, a loop selection unit (loop selector) 103, a program conversion unit (program converter) 404, a conversion determination unit (conversion determiner) 105, a loop dividing unit (loop divider) 106, a loop exchanging unit (loop exchanger) 108, a variables reallocating unit (variables re-allocator unit) 109, and an allocation number determination (allocation number determiner) unit 410.

Figures 21, 22:
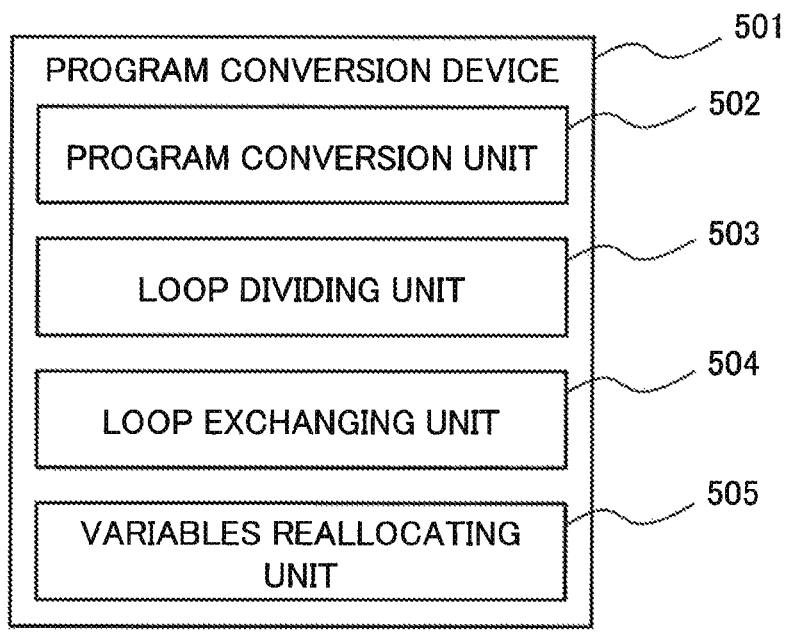
FIG. 21 is a diagram illustrating an example of a program including directive information.
FIG. 22 is a block diagram illustrating a configuration of a program conversion device according to a fifth example embodiment of the present invention.

The program conversion device 401 inputs a program including directive information (exemplified in FIG. 21, a termination program), and outputs an object program including the vectorized termination program. FIG. 21 is a diagram illustrating an example of a program including directive information.

A program exemplified in FIG. 21 includes directive information "#pragma_hint_averageiters=40". This represents that a possibility that the number of iterations relating to an outer loop "for(i1=0;i1<100;i1++)" following the directive information is 40 times is high. In other words, an outer loop "for(i1=0;i1<100;i1++)" is iteration processing corresponding to 100 times maximally, but actually, a possibility that the outer loop is iteration processing corresponding to 40 times is high. In other words, directive information indicates the number of iterations when a program is converted.

Figure 20:
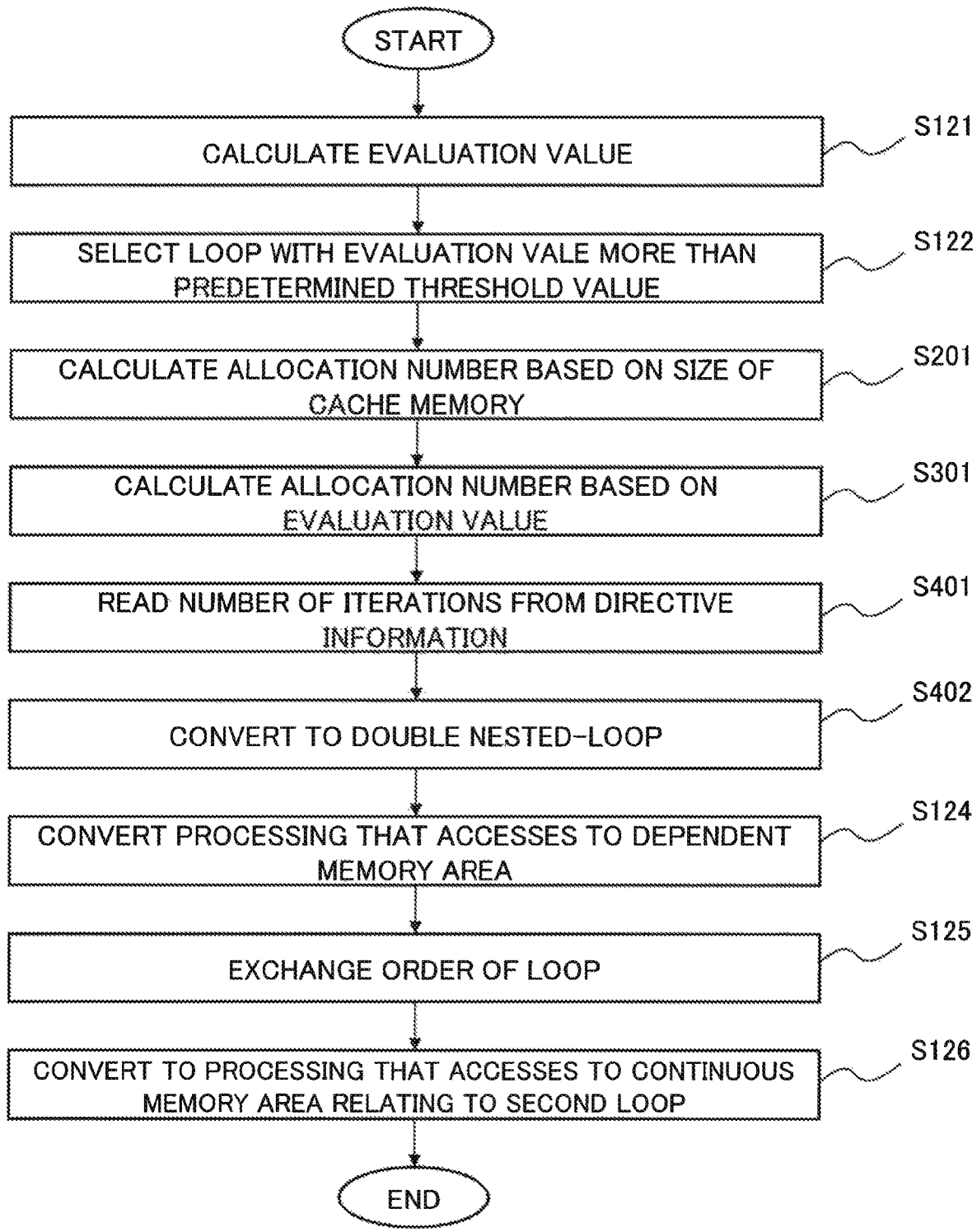
FIG. 20 is a flowchart illustrating a flow of processing in the program conversion device according to the fourth example embodiment.

Next, processing in the program conversion device 401 according to the fourth example embodiment of the present invention will be described in detail with reference to FIG. 20. FIG. 20 is a flowchart illustrating a flow of processing in the program conversion device 401 according to the fourth example embodiment.

The loop selection unit 103 calculates an evaluation value relating to inner processing included in an input program by executing similar processing to processing illustrated in FIG. 4 (Step S121). The loop selection unit 103 selects inner processing (specifically, a loop) with an evaluation value relating to the inner processing more than a predetermined threshold value among inner processing included in a program (Step S122).

Next, the allocation number determination unit 410 calculates the number of pieces of data accessed in inner processing in an outer loop including the inner processing selected in Step S122, and calculates a total sum of the number of pieces of data calculated relating to the outer loop. The allocation number determination unit 410 calculates the number of iterations (an allocation number, hereinafter, referred to as a "first allocation number") in a second loop, when an outer loop is converted to a double nested-loop by dividing a size of a cache memory included in an information processing device for executing an object program after conversion by a calculated total sum (Step S201). When an allocation number is not an integer, the allocation number determination unit 410 may truncate the allocation number after a decimal point.

Next, the allocation number determination unit 410 calculates an allocation number (hereinafter, referred to as a "second allocation number"), based on the evaluation value calculated by the loop selection unit 103 (Step S301).

The program conversion unit 404 reads the number of times from directive information included in an input program (Step S401), and separates processing relating to an outer loop (the number of iterations is assumed to be T) into two pieces (chunks, subsets) of processing. One piece (chunk, subset) is a first outer loop in which processing is repeated the read number of times. The other piece (chunk, subset) is a second outer loop in which processing is repeated the number of times (T−(the read number of times)) executed after the first outer loop. The program conversion unit 404 converts a first outer loop and a second outer loop to double nested-loop processing, respectively (Step S402). The program conversion unit 404 sets the number of iterations (allocation number) in a second loop relating to a first outer loop to a first allocation number and converts processing relating to the first outer loop to double nested-loop processing. The program conversion unit 404 sets the number of iterations (allocation number) in a second loop relating to the second outer to as a second allocation number and converts processing relating to a second outer loop to double nested-loop processing (Step S402). In other words, the program conversion unit 404 converts processing of an outer loop to processing that includes one piece (chunk, subset) of repeating processing generated by dividing an outer processing based on a size of a cache memory size the number of times included in directive information and the other piece (chunk, subset) of repeating processing generated by dividing the outer processing based on an evaluation value the number of times (T−(read number of times)). Specifically, the program conversion unit 404 executes processing that includes repeating processing generated by dividing an outer processing based on a size of a cache memory size the number of times included in directive information and repeating processing generated by dividing the outer processing based on an evaluation value the number of times designated in the program.

Next, advantageous effects relating to the program conversion device 401 according to the fourth example embodiment will be described.

The program conversion device 401 according to the present example embodiment can convert even a program including a loop having termination determination processing to a quick program executable by an information processing device including a vector processor. A reason for this is a similar reason to the reason described above in the third example embodiment regarding a configuration of the program conversion device 401 according to the fourth example embodiment.

Further, the program conversion device 401 according to the present example embodiment can convert to a program with further high execution efficiency. A reason for this is that data to be accessed in a plurality of continuous loop processing are read from a cache memory during a period corresponding to the number rotations, which is expected to be the number of rotations until termination occurs; and efficiency in loop processing is high even after the number of rotations at which it is highly likely that processing may be terminated.

Fifth Example Embodiment

Next, a fifth example embodiment according to the present invention common to the first to fourth example embodiments of the above-described present invention will be described.

A configuration of a program conversion device 501 according to the fifth example embodiment of the present invention will be described in detail with reference to FIG. 22. FIG. 22 is a block diagram illustrating a configuration of the program conversion device 501 according to the fifth example embodiment of the present invention.

The program conversion device 501 according to the fifth example embodiment includes a program conversion unit (program converter) 502, a loop dividing unit (loop divider) 503, a loop exchanging unit (loop exchanger) 504, and a variables reallocating unit (variable re-allocator) 505.

The program conversion device 501 converts a program including above-described termination determination processing. The program includes second loop processing that includes repeating first loop processing a plurality of times. The first loop processing executes first processing in order. In first loop processing, a discontinuous memory area is accessed for the processing order. Further, the second loop processing includes determination processing (termination determination processing) of terminating the second loop processing depending on whether or not a condition is satisfied.

The program conversion unit 502 converts iteration processing relating to the second loop processing to third loop processing that is repeated a first number of times and to fourth loop processing that is repeated in the third loop processing a second number of times.

The loop dividing unit 503 converts to processing that repeats, the first number of times, iterating the first loop processing the second number of times and iterating the determination processing the second number of times.

The variables reallocating unit 505 converts the first processing and the determination processing to processing that accesses to a memory area different for the each fourth loop processing, the memory area being continuous in a processing order in the fourth loop processing.

The loop exchanging unit 504 exchanges a processing order of the fourth loop processing and the first loop processing.

The program conversion unit 502 is implementable by a function included in the program conversion unit 104 (FIG. 1), the program conversion unit 204 (FIG. 15), the program conversion unit 304 (FIG. 17), or the like, for example. The loop dividing unit 503 is implementable by a function included in the loop dividing unit 106 (FIG. 1) and the like, for example. The variables reallocating unit 505 is implementable by a function included in the variables reallocating unit 109 (FIG. 1) and the like, for example. The loop exchanging unit 504 is implementable by a function included in the loop exchanging unit 108 (FIG. 1) and the like.

Next, advantageous effects relating to the program conversion device 501 according to the fifth example embodiment will be described.

The program conversion device 501 according to the fifth example embodiment can convert even a program including a loop having termination determination processing to a quick program executable by an information processing device including a vector processor. A reason for this is that even a program including inner processing and termination processing is converted to a program that accesses to a value stored in a continuous memory area regarding a loop variable capable of storing a value depending on the number of iterations in an innermost loop after conversion (specifically, a fourth loop after processing is exchanged).

(Hardware Configuration Example)

A configuration example of hardware resources that realize a program conversion device according to each example embodiment of the present invention will be described. However, the program conversion device may be realized using physically or functionally at least two calculation processing devices. Further, the program conversion device may be realized as a dedicated device.

Figure 24:
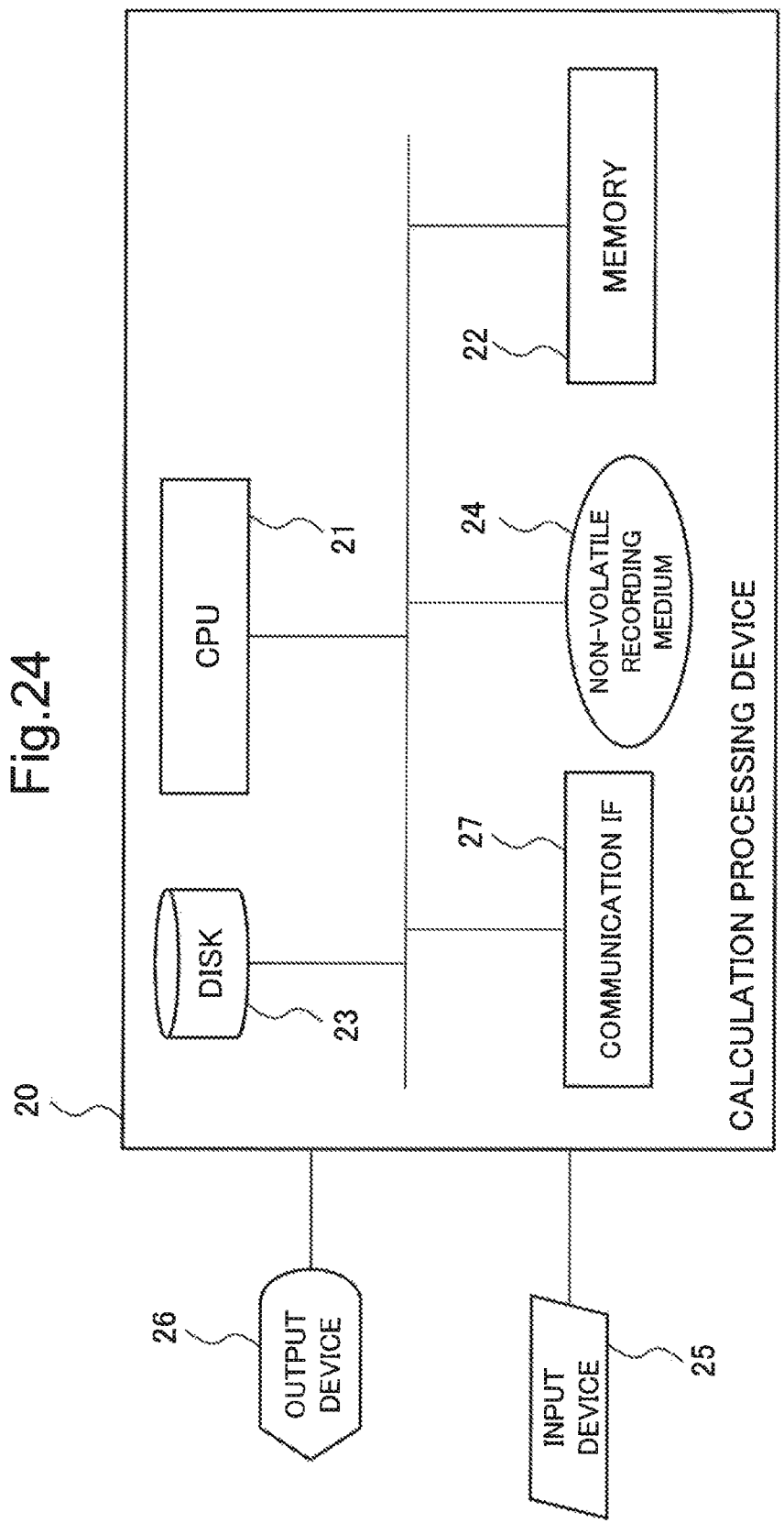
FIG. 24 is a block diagram schematically illustrating a hardware configuration of a calculation processing device capable of realizing program conversion device according to each example embodiment of the present invention.

FIG. 24 is a block diagram schematically illustrating a hardware configuration of a calculation processing device capable of realizing program conversion device according to the first to fifth example embodiments of the present invention. A calculation processing device 20 includes a central processing unit (CPU) 21, a memory 22, a disk 23, a non-transitory recording medium 24. The calculation processing device 20 further includes a communication interface (hereinafter, expressed as. "communication I/F") 27. The calculation processing device 20 may connect an input device 25 and an output device 26. The calculation processing device 20 can execute transmission/reception of information to/from another calculation processing device and a communication device via the communication I/F 27.

The non-transitory recording medium 24 is, for example, a computer-readable Compact Disc, Digital Versatile Disc. The non-transitory recording medium 24 may be Universal Serial Bus (USB) memory, Solid State Drive or the like. The non-transitory recording medium 24 allows a related program to be holdable and portable without power supply. The non-transitory recording medium 24 is not limited to the above-described media. Further, a related program can be carried via a communication network by way of the communication I/F 27 instead of the non-transitory recording medium 24.

In other words, the CPU 21 copies, on the memory 22, a software program (a computer program: hereinafter, referred to simply as a "program") stored by the disk 23 when executing the program and executes arithmetic processing. The CPU 21 reads data necessary for program execution from the memory 22. When display is needed, the CPU 21 displays an output result on the output device 26. When a program is input from the outside, the CPU 21 reads the program from the input device 25. The CPU 21 interprets and executes a program conversion program (FIG. 2, FIG. 3, FIG. 4, FIG. 16, FIG. 18, or FIG. 20) present on the memory 22 corresponding to a function (processing) indicated by each unit illustrated in FIG. 1, FIG. 15, FIG. 17, FIG. 19, or FIG. 22 described above. The CPU 21 sequentially executes the processing described in each example embodiment of the present invention.

In other words, in such a case, it is conceivable that the present invention can also be made using the program conversion program. Further, it is conceivable that the present invention can also be made using a computer-readable, non-transitory recording medium storing the program conversion program.

The present invention has been described using the above-described example embodiments as example cases. However, the present invention is not limited to the above-described example embodiments. In other words, the present invention is applicable with various aspects that can be understood by those skilled in the art without departing from the scope of the present invention.

This application is based upon and claims the benefit of priority from Japanese patent application No. 2016-000046, filed on Jan. 4, 2016, the disclosure of which is incorporated herein in its entirety.

REFERENCE SIGNS LIST 101 program conversion device
102 efficiency calculating unit
103 loop selection unit
104 program conversion unit
105 conversion determining unit
106 loop dividing unit
108 loop exchanging unit
109 variables reallocating unit
201 program conversion device
204 program conversion unit
210 allocation number determination unit
301 program conversion device
304 program conversion unit
310 allocation number determination unit
401 program conversion device
404 program conversion unit
410 allocation number determination unit
501 program conversion device
502 program conversion unit
503 loop dividing unit
504 loop exchanging unit
505 variables reallocating unit
20 calculation processing device
21 CPU
22 memory
23 disk
24 non-transitory recording medium
25 input device
26 output device
27 communication IF

The invention claimed is:

1. A program conversion device having a processor comprising:
a program converter configured to convert a program including second loop processing that repeats first processing and determination processing a plurality of times to a program including third loop processing and fourth loop processing;
a loop divider configured to convert the converted program to a first-number-of-times repeating processing that includes second-number-of-times repeating processing of the first loop processing and the second-number-of-times repeating processing of the determination processing;
a variables re-allocator configured to convert the first processing and the determination processing to processing that accesses to memory areas that are different for fourth loop processing and that are continuous in a processing order in the fourth loop processing; and
a processing exchanger configured to exchange a processing order of the fourth loop processing and the first loop processing, wherein
the first loop processing is executing first processing in order and accesses to a discontinuous area regarding to the order in the first processing,
the determination processing is terminating the second loop processing based on whether or not a condition is satisfied,
the third loop processing is the-first-number-of-times repeating processing related to the second loop processing, and
the fourth loop processing is the-second-number-of-times repeating processing related to the second loop processing in the third loop processing.

2. The program conversion device according to claim 1, further comprising:
an efficiency calculator configured to calculate a number of times of the determination processing via which the first processing is executed in the second loop processing; and
a loop selector configure to select first loop processing when a number of times of the determination processing satisfies a predetermined condition from the program, wherein
the program converter converts the second loop processing including the first loop processing selected by the loop selector.

3. The program conversion device according to claim 2, wherein
the efficiency calculator determines whether or not the memory area continuous in respective loop processing in the second loop processing is accessed and calculates an evaluation value,
the loop selector selects the first loop processing in which the evaluation value satisfies a predetermined condition, and
the evaluation value is small when the memory area is accessed, as compared with when the memory area is not accessed, and is a value that decreases, as a number of times of the determination processing increases.

4. The program conversion device according to claim 1, further comprising:
an allocation number determiner configured to calculate the-second-number-of-times based on a value acquired by dividing a size of a cache memory in an target information processing device executing the program by a total sum of a size of data to be accessed in the first loop processing, wherein
the program converter converts based on the second number of times calculated by the allocation number determiner.

5. The program conversion device according to claim 3, further comprising:
an allocation number determiner configured to calculate a value depending on a magnitude of the evaluation value for the-second-number-of-times, wherein
the program converter converts based on the-second-number-of-times calculated by the allocation number determiner.

6. The program conversion device according to claim 3, further comprising:
an allocation number determiner configured to calculate a first allocation number indicating a value acquired by dividing a size of a cache memory included in an information processing device executing the program by a total sum of a size of data to be accessed in the first loop processing and a second allocation number indicating a value depending on a magnitude of the evaluation value, wherein the program converter converts, based on directive information including a number of iterations in converting to the third loop processing and the fourth loop processing included in the program, the second loop processing to two pieces of third loop processing and two pieces of fourth loop processing, wherein in the two pieces of third loop processing, one piece of the third loop processing is the-number-of-iterations repeating processing of the second loop processing, in the two pieces of fourth loop processing, one piece of the fourth loop processing is the-first-allocation-number-iterations repeating processing in the one piece of third loop processing, in the two pieces of third loop processing, the other piece of third loop processing is repeating processing of the second loop processing until the number of iteration designated by the program after the-number-of-iterations repeating processing, and in the two pieces of fourth loop processing, the other piece of the fourth loop processing is the-second-allocation-number-iterations repeating processing in the other piece of third loop processing.

7. A program conversion method executed by an information processing apparatus comprising:

converting a program including second loop processing that repeats first processing and determination processing a plurality of times to a program including third loop processing and fourth loop processing;

converting the converted program to a first-number-of-times repeating processing that includes second-number-of-times repeating processing of the first loop processing and the second-number-of-times repeating processing of the determination processing;

converting the first processing and the determination processing to processing that accesses to memory areas that are different for fourth loop processing and that are continuous in a processing order in the fourth loop processing; and exchanging a processing order of the fourth loop processing and the first loop processing, wherein the first loop processing is executing first processing in order and accesses to a discontinuous area regarding to the order in the first processing, the determination processing is terminating the second loop processing based on whether or not a condition is satisfied, the third loop processing is the-first-number-of-times repeating processing related to the second loop processing, and the fourth loop processing is the-second-number-of-times repeating processing related to the second loop processing in the third loop processing.

8. A non-transitory recoding medium storing a program conversion program recorded therein, the program making a computer achieve:

a program conversion function configured to convert a program including second loop processing that repeats first processing and determination processing a plurality of times to a program including third loop processing and fourth loop processing;

a loop dividing function configured to convert the converted program to a first-number-of-times repeating processing that includes second-number-of-times repeating processing of the first loop processing and the second-number-of-times repeating processing of the determination processing;

a variables reallocating function configured to convert the first processing and the determination processing to processing that accesses to memory areas that are different for fourth loop processing and that are continuous in a processing order in the fourth loop processing; and a processing exchanging function configured to exchange processing order of the fourth loop processing and the first loop processing, wherein the first loop processing is executing first processing in order and accesses to a discontinuous area regarding to the order in the first processing, the determination processing is terminating the second loop processing based on whether or not a condition is satisfied, the third loop processing is the-first-number-of-times repeating processing related to the second loop processing, and the fourth loop processing is the-second-number-of-times repeating processing related to the second loop processing in the third loop processing.

9. The non-transitory recoding medium storing the program conversion program according to claim 8, further comprising:

an efficiency calculating function configured to calculate number of times of the determination processing via which the first processing is executed in the second loop processing; and a loop selection function configured to select first loop processing when a number of times of the determination processing satisfies a predetermined condition from the program, wherein the program conversion function converts the second loop processing including the first loop processing selected by the loop selection function.

10. The non-transitory recoding medium storing the program conversion program according to claim 9, wherein the efficiency calculating function determines whether or not the memory area continuous in respective loop processing in the second loop processing is accessed and calculates an evaluation value, the loop selection function selects the first loop processing in which the evaluation value satisfies a predetermined condition, and the evaluation value is small when the memory area is accessed, as compared with when the memory area is not accessed, and is a value that decreases, as a number of times of the determination processing increases.

* * * * *